United States Patent
Hoffman et al.

(10) Patent No.: US 12,178,154 B2
(45) Date of Patent: Dec. 31, 2024

(54) METHOD AND APPARATUS FOR MOUNTING A FLAIL MOWER

(71) Applicant: Venture Products, Inc., Orrville, OH (US)

(72) Inventors: Michael S. Hoffman, Orrville, OH (US); Corey Gerber, Smithville, OH (US)

(73) Assignee: Venture Products, Inc., Orrville, OH (US)

( * ) Notice: Subject to any disclaimer, the term of this patent is extended or adjusted under 35 U.S.C. 154(b) by 884 days.

(21) Appl. No.: 17/179,595

(22) Filed: Feb. 19, 2021

(65) Prior Publication Data

US 2022/0225567 A1 Jul. 21, 2022

Related U.S. Application Data

(60) Provisional application No. 63/139,547, filed on Jan. 20, 2021.

(51) Int. Cl.
*A01D 34/73* (2006.01)
(52) U.S. Cl.
CPC ......... *A01D 34/733* (2013.01); *A01D 34/736* (2013.01)
(58) Field of Classification Search
CPC .... A01D 34/733; A01D 34/736; A01D 34/74; A01D 34/435; A01D 34/535
See application file for complete search history.

(56) References Cited

U.S. PATENT DOCUMENTS

| | | | |
|---|---|---|---|
| 2,139,625 A | 12/1938 | Pruss | |
| 2,242,472 A | 5/1941 | Keeler | |
| 3,605,906 A | 9/1971 | Coates | |
| 3,706,186 A | 12/1972 | Hurlburt et al. | |
| 4,159,613 A | 7/1979 | Knudson et al. | |
| 4,180,282 A | 12/1979 | Henning | |
| 4,236,329 A | 12/1980 | Hetrick | |
| 4,416,109 A * | 11/1983 | Slazas | A01D 34/43 56/15.8 |
| 4,697,404 A | 10/1987 | Brockmeier et al. | |
| 4,878,713 A * | 11/1989 | Zanetis | E02F 5/00 404/90 |
| 5,125,174 A | 6/1992 | Watson et al. | |
| 5,666,794 A * | 9/1997 | Vought | A01D 41/16 172/112 |
| 5,758,478 A * | 6/1998 | Bando | A01D 34/662 56/DIG. 14 |
| 5,775,075 A | 7/1998 | Dannar | |
| 6,082,086 A | 7/2000 | Togoshi et al. | |

(Continued)

FOREIGN PATENT DOCUMENTS

| | | |
|---|---|---|
| GB | 808218 | 1/1959 |
| GB | 2592185 | 8/2021 |

*Primary Examiner* — Abigail A Risic
(74) *Attorney, Agent, or Firm* — Sand, Sebolt & Wernow Co., LPA

(57) ABSTRACT

A method and apparatus for attaching a forward-mounted implement that may allow pivotal movement of the implement around a longitudinal axis to better maintain proper operational height when operating on uneven or sloped terrain. Further provided, the attachment mechanism of the present disclosure may allow for a secure and safe attachment to an associated tractor or other similar vehicle while simultaneously providing for a reduced production cost and less maintenance requirements.

24 Claims, 17 Drawing Sheets

(56) References Cited

U.S. PATENT DOCUMENTS

| | | | |
|---|---|---|---|
| 6,276,119 B1 * | 8/2001 | Oshima | A01D 34/74 |
| | | | 56/15.9 |
| 6,336,312 B1 | 1/2002 | Bednar et al. | |
| 6,347,503 B1 | 2/2002 | Esau et al. | |
| 6,928,757 B2 | 8/2005 | Bloxdorf et al. | |
| 7,293,398 B2 | 11/2007 | Koehn | |
| 7,669,395 B2 | 3/2010 | Wehler et al. | |
| 7,870,711 B2 | 1/2011 | Koehn | |
| 8,099,936 B2 * | 1/2012 | Bryant | A01D 34/58 |
| | | | 56/294 |
| 8,104,253 B2 | 1/2012 | Coffin et al. | |
| 8,112,976 B1 | 2/2012 | Kallevig et al. | |
| 9,554,514 B2 * | 1/2017 | Marotte | A01D 67/005 |
| 9,693,501 B2 | 7/2017 | Giere | |
| 10,334,780 B2 | 7/2019 | Bartel et al. | |
| 10,561,064 B2 | 2/2020 | Hoffman et al. | |
| 11,071,250 B2 | 7/2021 | Aposhian et al. | |
| 11,206,759 B2 | 12/2021 | Gust et al. | |
| 11,259,461 B2 | 3/2022 | Bengtzohn et al. | |
| 11,470,773 B2 * | 10/2022 | Wenzel | A01D 34/74 |
| 2004/0182056 A1 | 9/2004 | Greenhoe | |
| 2004/0216654 A1 | 11/2004 | Fischer | |
| 2004/0221561 A1 | 11/2004 | Koehn | |
| 2005/0028406 A1 | 2/2005 | Elliott | |
| 2006/0053761 A1 * | 3/2006 | Lougheed | A01D 34/435 |
| | | | 56/15.8 |
| 2008/0127619 A1 | 6/2008 | Link | |
| 2008/0289310 A1 | 11/2008 | Hagen et al. | |
| 2009/0100816 A1 | 4/2009 | Rinholm et al. | |
| 2010/0176563 A1 * | 7/2010 | Madler | B60G 21/05 |
| | | | 280/5.507 |
| 2011/0180282 A1 | 7/2011 | Reavie et al. | |
| 2013/0248211 A1 | 9/2013 | Warchola et al. | |
| 2015/0096278 A1 | 4/2015 | Sprinkmann et al. | |
| 2015/0308060 A1 | 10/2015 | Beaird, III | |
| 2016/0095273 A1 | 4/2016 | Merkt | |
| 2017/0006760 A1 * | 1/2017 | Nielsen | A01D 34/74 |
| 2018/0271017 A1 | 9/2018 | Merkt | |
| 2018/0359902 A1 | 12/2018 | McAdam et al. | |
| 2019/0133038 A1 | 5/2019 | Arnold et al. | |
| 2019/0150359 A1 | 5/2019 | Gust et al. | |
| 2019/0216000 A1 | 7/2019 | Hiller et al. | |
| 2019/0257058 A1 | 8/2019 | Merkt | |
| 2020/0022306 A1 | 1/2020 | Meyer | |
| 2020/0221634 A1 | 7/2020 | Nicholson | |
| 2020/0260639 A1 | 8/2020 | Walker | |
| 2020/0329624 A1 | 10/2020 | Thorsell | |
| 2021/0243952 A1 | 8/2021 | Weber et al. | |
| 2021/0282317 A1 | 9/2021 | Fillep et al. | |
| 2022/0117153 A1 * | 4/2022 | Nielsen | |
| 2022/0361402 A1 | 11/2022 | Fugett et al. | |
| 2023/0042867 A1 | 2/2023 | Degnan et al. | |

* cited by examiner

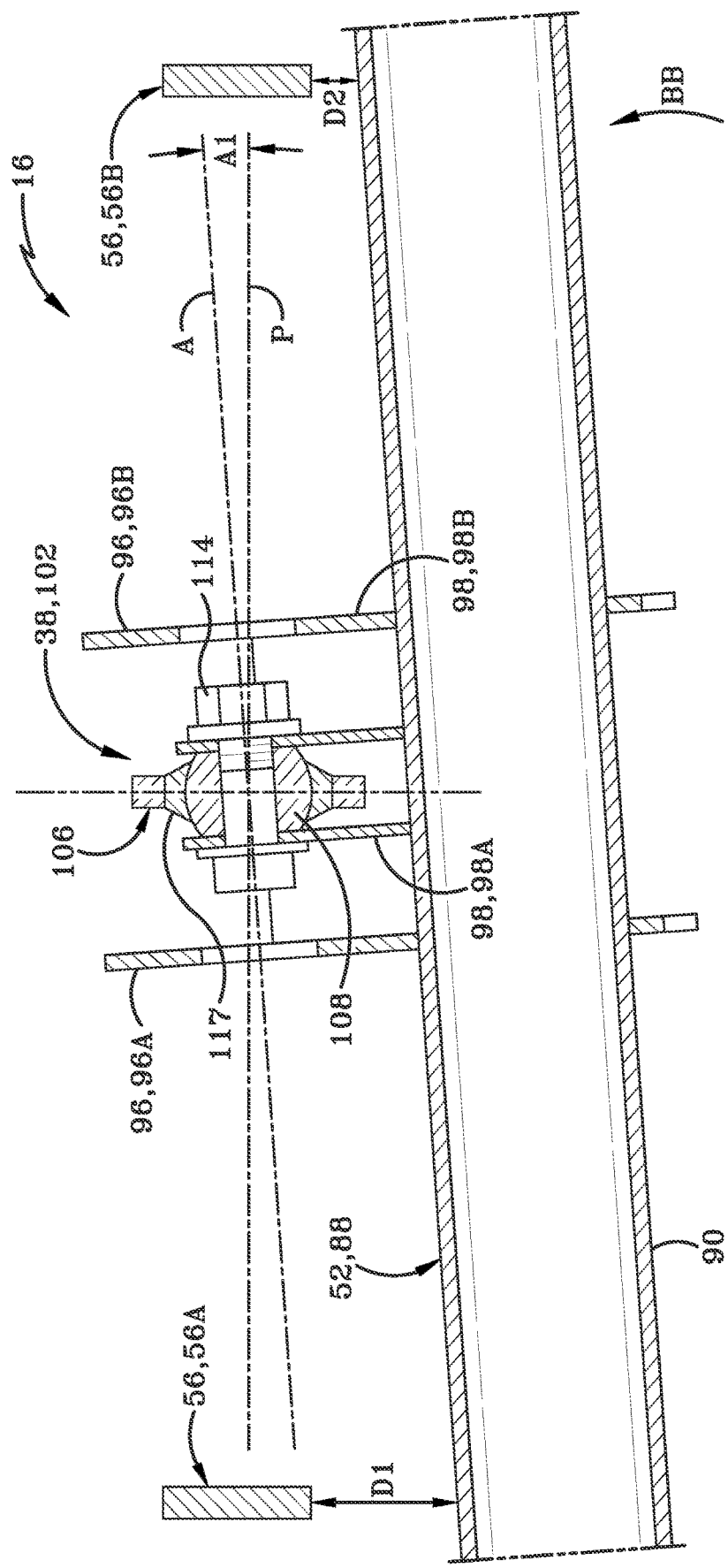

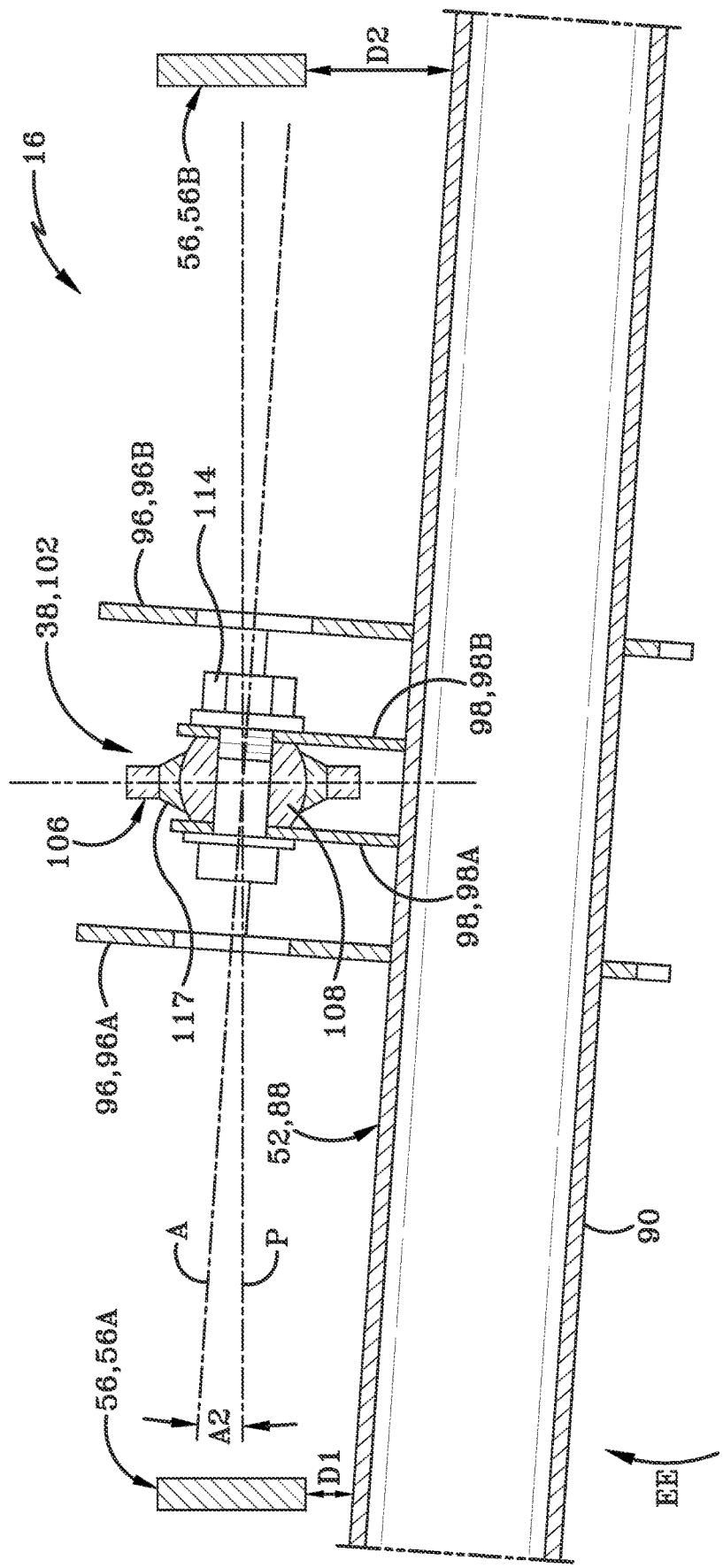

METHOD AND APPARATUS FOR MOUNTING A FLAIL MOWER

CROSS REFERENCE TO RELATED APPLICATIONS

This application claims the benefit of U.S. Provisional Application Ser. No. 63/139,547, filed Jan. 20, 2021, the disclosure of which is incorporated herein by reference.

TECHNICAL FIELD

The present disclosure relates to tractor mounted implements. More particularly, in one example, the present disclosure relates to a mounting frame and assembly for tractor mounted implements carried in front of a tractor. Specifically, in another example, the present disclosure relates to a mounting assembly operable to connect an implement to the forward end of a tractor while allowing for lateral pivoting of the implement about a longitudinal pivot axis.

BACKGROUND

Tractors are commonly used in many areas including agricultural, landscaping, snow-clearing, and other similar lines of work, and in both residential and commercial applications. Often, these tractors carry or are otherwise connected to one or more implements on the forward end and/or the rearward end thereof. Some examples of tractor mounted implements can include plows, earth engaging equipment, power brushes, mower attachments, and/or other similar landscaping and/or maintenance-type attachments. As used in smaller applications, such as residential and/or small commercial applications, tractors are particularly useful for mowing, other landscape maintenance, snow removal, and/or surface cleaning and preparation applications.

One of the more common uses of a tractor mounted implement is the use of a mowing attachment such as a flail mower or the like, which may be connected to a forward end of a tractor and driven by the tractor over an area to be mowed. These implements may vary in size and operation; however, it is common to use such implements over uneven or sloped terrains.

Typically, a forward-mounted tractor implement such as a flail mower includes a series of wheels and/or ground engaging skids to allow the implement to track the ground surface. When operated on a flat surface, these wheels and/or skids help support the implement at a proper operational height. When used with a mowing implement, this can help keep the cut of the associated landscaping at a substantially even height, thus providing a uniform appearance and allowing for regular maintenance.

When operated on uneven or sloped terrain; however, the use of wheels, and/or skids may cause an uneven operation of the associated implement. Where the implement is a mower, for example, this may result in an uneven cut and or further damage to the terrain. Typically, the issue arises in that the wheels and/or skids of the implement that track the ground may cause the implement to move or bounce as the slope and condition of the terrain changes. Alternatively, the implement may ride on one edge thus raising the opposite side off of the ground. For example, when utilizing a mowing implement on sloped terrain, current attachment assemblies maintain the mowing attachment in a level configuration. Where one side is in contact with a ground surface, such as on the high side of the terrain, that side of the mower may cut closer to the ground surface. On the opposite side, the mower may cut at a higher length, or on larger slopes, may disconnect from the ground surface entirely, Thus, on the high side of the slope, the vegetation to be cut too short and the mower may contact the ground surface, which may further damage the ground or the mowing attachment. At the same time, on the low side of the slope, the vegetation may be left too long, or may not be cut at all.

Current solutions typically involve various applications of shocks, springs, or the like to allow some vertical movement of the tractor implement as the implement is operated over uneven terrain. Other times, the attachment between the implement and the tractor is intentionally loosened or not fully secured to allow some play in the attachment mechanism, again, with the purpose of allowing some vertical movement of the implement. In both instances, these current solutions fall short as in they are inconsistent, and in the instance of loosened attachment points, may be dangerous to an operator, bystanders, and/or property as the loose attachment may cause failure and/or injury. Further, the addition of shocks, springs and other similar measures increase the cost, maintenance requirements, and probability of failure during operation while only minimally addressing these issues.

SUMMARY

The present disclosure addresses these and other issues by providing a method and apparatus for attaching a forward-mounted implement that may allow pivotal movement of the implement around a longitudinal axis to better maintain proper operational height when operating on uneven or sloped terrain. Further provided, the attachment mechanism of the present disclosure may allow for a secure and safe attachment to an associated tractor or other similar vehicle while simultaneously providing for a reduced production cost and less maintenance requirements.

In one aspect, an exemplary embodiment of the present disclosure may provide an attachment frame for a tractor mounted implement comprising: a first side member operable to connect to a frame of a tractor; a second side member spaced laterally apart from the first side member operable to connect to the frame of the tractor; a first cross member disposed between the first and second side member; and a second cross member forward of and connected to the first cross member operable to connect an implement to the first cross member, wherein the second cross member and the implement are rotatable relative to the first cross member about a longitudinal axis defined by a longitudinal centerline of the attachment frame.

In another aspect, and exemplary embodiment of the present disclosure may provide a method of maintaining a level orientation of an implement relative to a ground surface comprising: traversing a ground surface in a first condition with a tractor carrying an implement thereon; traversing the ground surface in a second condition with the tractor and implement; rotating the implement about a longitudinal axis defined by a centerline of an attachment frame connecting the implement to the tractor from a first position wherein the implement is generally horizontal relative to a cross member of the attachment frame to a second position wherein the implement is angled relative to the cross member of the attachment frame in response to the change of the ground surface from the first condition to the second condition; and biasing the implement back to the first position with a spring assembly when the level of the ground surface reverts to the first condition.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 11B is a rear cross-sectional operational view of a pivot assembly of an attachment mechanism according to one aspect of the present disclosure.

FIG. 12B is a rear cross-sectional operational view of a pivot assembly of an attachment mechanism according to one aspect of the present disclosure.

Similar numbers refer to similar parts throughout the drawings.

DETAILED DESCRIPTION

Figure 1:
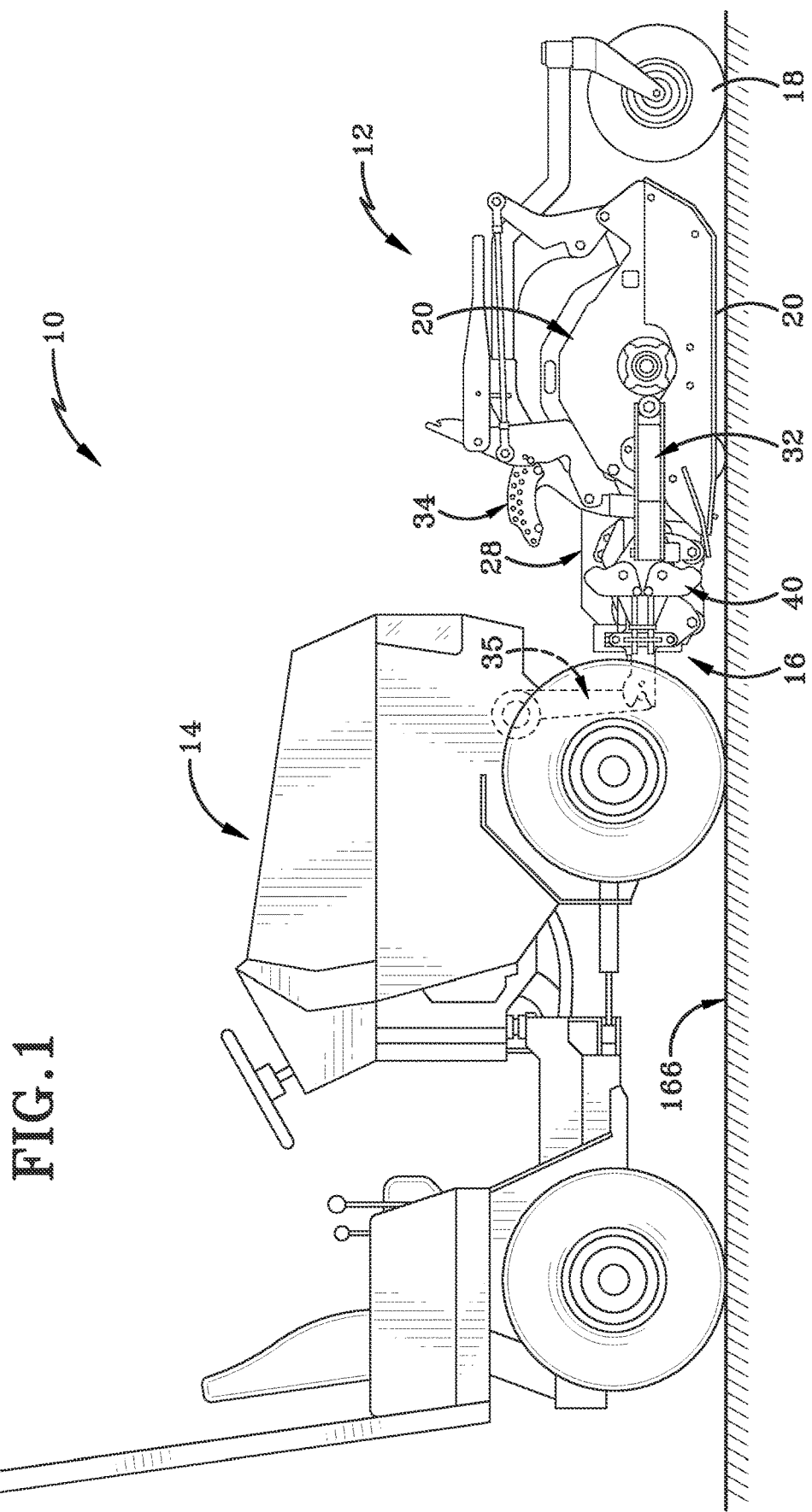
FIG. 1 is a side elevation view of a tractor and a forwardly-mounted implement utilizing an attachment mechanism according to one aspect of the present disclosure.

With reference to FIG. 1, an attachment for connecting a forward-driven implement to a tractor is shown and generally indicated at 10. At its most basic, the attachment system 10 includes an implement 12 connected to a tractor 14 using an attachment frame assembly 16.

Figure 2:
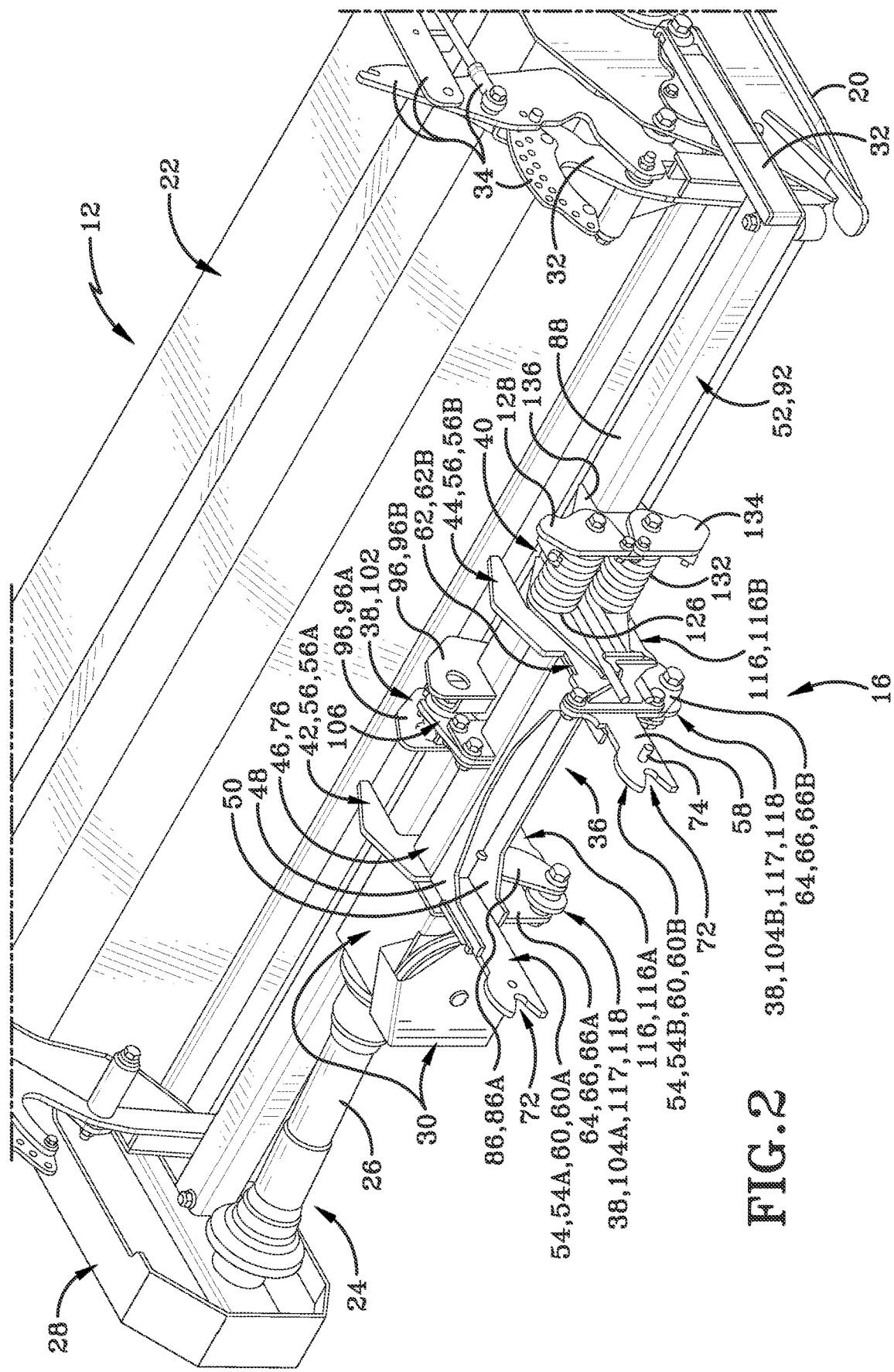
FIG. 2 is a top right side isometric perspective view of an implement and attachment mechanism according to one aspect of the present disclosure.

With references to FIGS. 1 and 2, implement 12 may be any implement 12 suitable for connection to a tractor, and although depicted and described herein as a front-driven implement, implement 12 may likewise be attached to a tractor 14 in any suitable position according to the desired implementation. For simplicity and clarity in the disclosure, implement 12 will be described generally as a flail mower; however, the attachment frame assembly 16 may be utilized with any suitable implement as will become apparent herein.

Implement 12 may include at least one ground-engaging member, which may be a wheel, a skid, a ski, or other suitable ground-engaging devices. Such ground-engaging surfaces are depicted and referenced herein as wheels 18 and skids 20. Collectively, these ground-engaging members may define the operational height of implement 12 as discussed further herein. Where implement 12 is a flail mower, wheels 18 and/or skids 20 may be adjusted to set the cut height of the mower, aka the height at which vegetation will be cut by the blades of the flail mower.

Implement 12 may further include a body 22 which may house one or more operational aspects of the implement. For example, where implement 12 is a flail mower, body 22 may house the blades, axles, and/or various drive and operational components. Implement 12 may further include a power system 24 which may be or include a power take-off (PTO) system 24. PTO 24 may further include a driveshaft 26 and other standard drive components, generally indicated at 28. PTO 24 may be powered via connection to one or more systems carried by tractor 14 according to the desired implementation. According to one aspect, PTO 24 may be powered by a belt-driven system, generally shown at reference 30 in FIG. 2. According to another aspect, PTO 24 may be chain-driven, hydraulically powered or may utilize any other suitable power transfer system as dictated by the desired implementation. According to another aspect, PTO 24 may be connected to a separate motor, such as a motor carried by implement 12, to power suitable aspects of implement 12, again as dictated by the desired implementation.

Implement 12 may further include one or more frame components generally indicated at 32 and may further include one or more adjustment mechanisms indicated generally at 34. It will be understood that these components, namely, frame components 32 and/or adjustment mechanisms 34, may vary depending on the type, size, and/or desired operation of implement 12 and may be configured or constructed according to known configurations and/or operation as dictated by the desired implementation and the particulars of any specific implement 12 employed with attachment system 10. It will be further understood that the adjustment mechanisms 34 may include one or more different types of adjustment mechanisms 34 that may allow for any suitable adjustments to implement as desired. According to one non-limiting example, adjustment mechanisms 34 may include operational height adjustment mechanisms as well as any suitable or desired adjustment system to raise or lower implement 12 from a stowed position to a deployed position and vice versa. Adjustment mechanisms 34 are therefore contemplated to include any suitable frame members, attachment mechanisms or fasteners, support members or structures, as well as any necessary and/or suitable adjustment means such as hydraulic cylinders, pneumatic actuators or the like. For purposes of clarity and simplicity in this disclosure, adjustment mechanisms 34 are understood to be included and operate according to known principles and will be omitted from further discussion herein unless specifically stated otherwise. Further, some structures and components described below may include mounting or attachment points for adjustment mechanisms 34 as needed, and will be omitted from discussion for clarity. It will be understood that these mounting and/or attachment points may be modified as necessary.

Frame components 32 of implement 12 may connect or otherwise secure implement 12 to the attachment frame assembly 16, which will be discussed in further detail below. Generally, frame components 32 may include any necessary or desired elements to support implement 12 and its various elements, and may vary in size, type, configuration, placement, and connection as dictated by the type of implement 12 used and the operational and structural needs thereof. Accordingly, as discussed herein, frame components 32 of implement 12 are discussed generally and attachment of other components thereto and removal therefrom may be accomplished by any suitable means, unless specifically stated otherwise.

Tractor 14 is shown in FIG. 1 and generally referenced as a tractor; however, it will be understood that tractor 14 may be any suitable powered vehicle capable of supporting, powering, and/or moving an implement 12 as discussed herein. According to a few non-limiting examples, tractor 14 may be a lawn tractor, a landscape tractor, a skid steer, a truck, an ATV or UTV, or any other suitable vehicle. Tractor 14 may further include a tractor frame 35 including one or more frame components operable to connect to attachment frame assembly 16 as discussed further herein. The components of tractor frame 35 may be standard components and include any suitable members for operable connection to a forward implement. It will be understood that the connection between tractor frame 35 and attachment frame assembly 16 may be accomplished through any suitable or desired means. Accordingly, reference to tractor frame 35 will be understood to include any suitable components for operable connection to the elements and components of attachment frame assembly 16, unless specifically stated otherwise.

With reference to FIGS. 2-9, attachment frame assembly 16 is shown and will be described in more detail. At its most basic, attachment frame assembly 16 may provide several advantages which will be discussed further with regards to the operation thereof.

Attachment frame assembly 16 may generally include three sections, namely, the mount frame section, or mount frame 36, pivot assemblies 38, and spring assembly 40. Mount frame 36 may have a first side member 42 spaced apart from a second side member 44 and defining therebetween a transverse direction. Mount frame 36 may further include a first cross member 46, an upper transverse support 48 and a lower transverse support 50. Upper transverse support 48 may be spaced apart from lower transverse support 50 and may define a vertical direction therebetween. Mount frame 36 may further include a second cross member 52 which may be generally parallel to first cross member 46 and may extend transversely between the outermost edges or sides of implement 12 as discussed further herein. First and second cross member 46 may be pivotally connected to each other as discussed further below.

Figure 3:
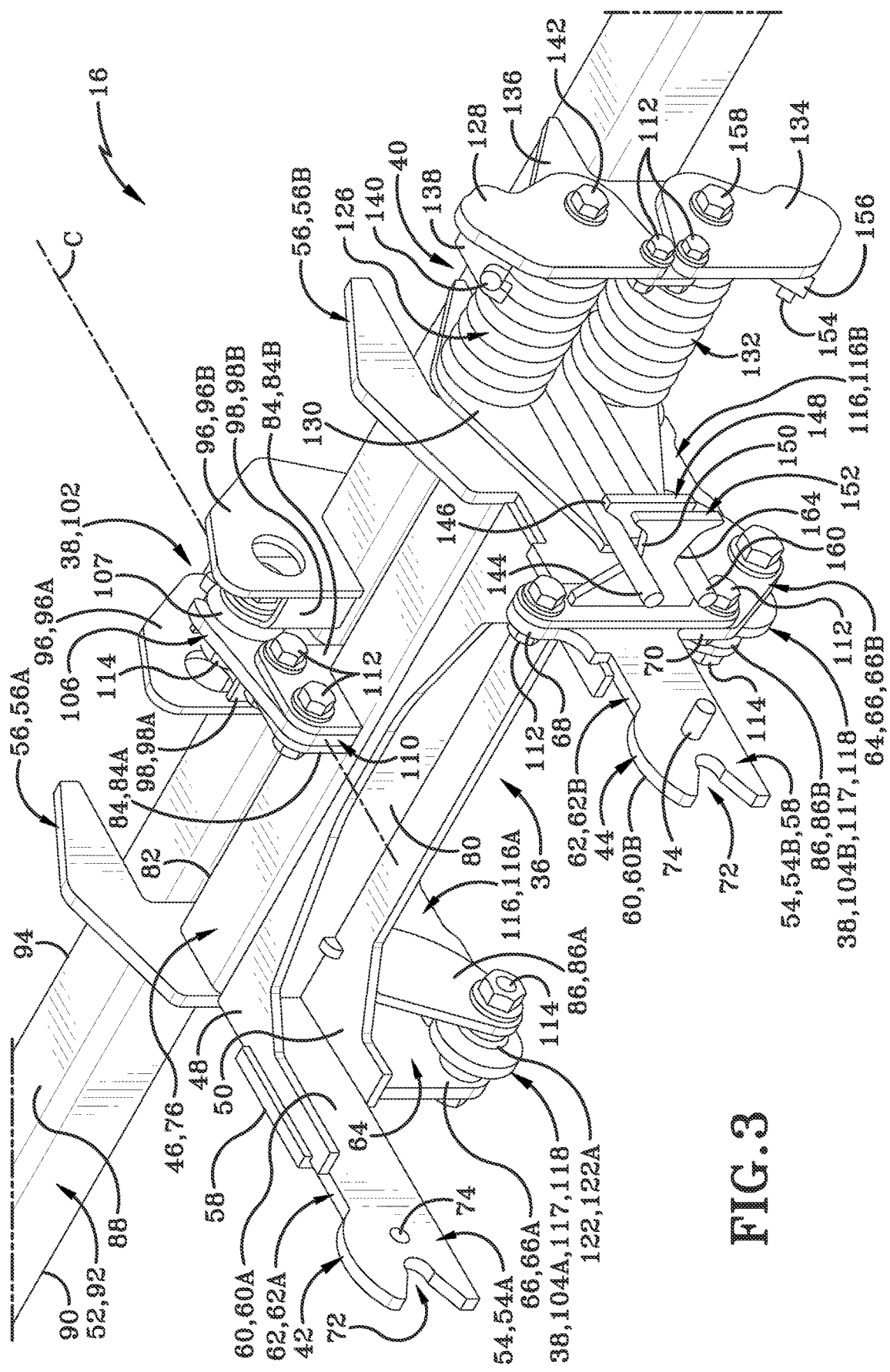
FIG. 3 is a top right isometric perspective close-up view of an attachment mechanism according to one aspect of the present disclosure.

Attachment frame assembly 16 may be generally symmetrical about a center line indicated in FIG. 3 as line C, which may extend longitudinally through a midpoint of attachment frame assembly 16, except for spring assembly 40, which may be positioned to one side of attachment frame assembly 16 without a counterpart on the opposite side. Attachment frame assembly 16 may be symmetrical about center line C in that a first side thereof may be a mirror image to a second side thereof, again excluding spring assembly 40. Accordingly, where features or components are substantially similar or identical to their opposite side counterpart, such components will be similarly numbered with the reference letter A (referring to the first side which may be defined as the left side as oriented in FIG. 3) or with the reference letter B (referring to the second side which may be defined as the right side as oriented in FIG. 3). For example, first side member 42 may have a rear arm 54A while second side member 44 may likewise have a rear arm 54B. It will be understood that although first side is indicated and discussed herein as the left side and second side is indicated and discussed herein as the right side given that the majority of components are symmetrical and mirror imaged, either side of center line C could be designated the first or second side. For purposes of clarity, this disclosure will limit its discussion to components on the first side being to the left of center line C (as viewed by an operator of the tractor 14 and as oriented in FIG. 3) and components on the second side being disposed on the right of center line C, unless specifically stated otherwise.

Figure 5:
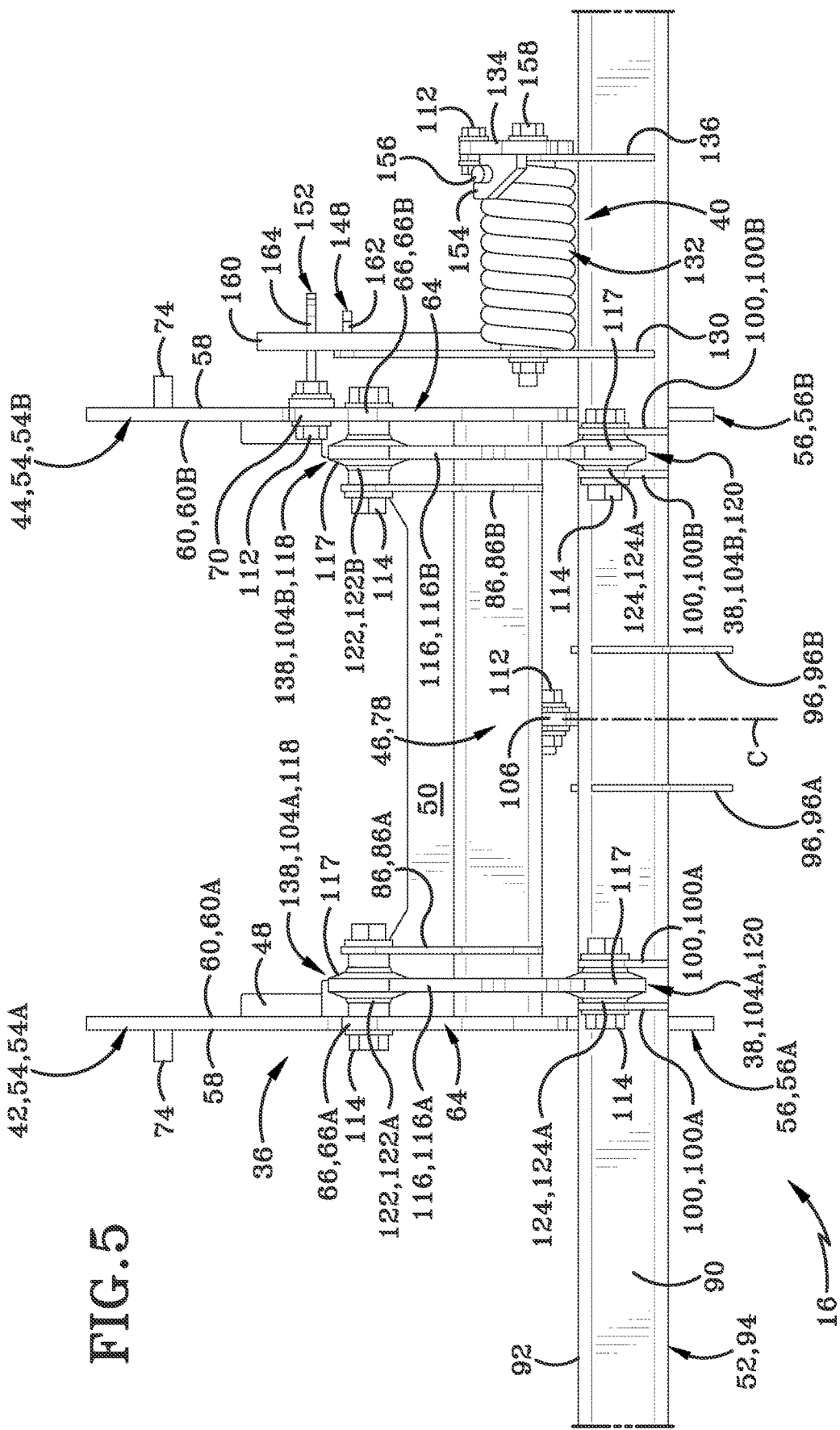
FIG. 5 is a bottom plan view of an attachment mechanism according to one aspect of the present disclosure.
Figure 6:
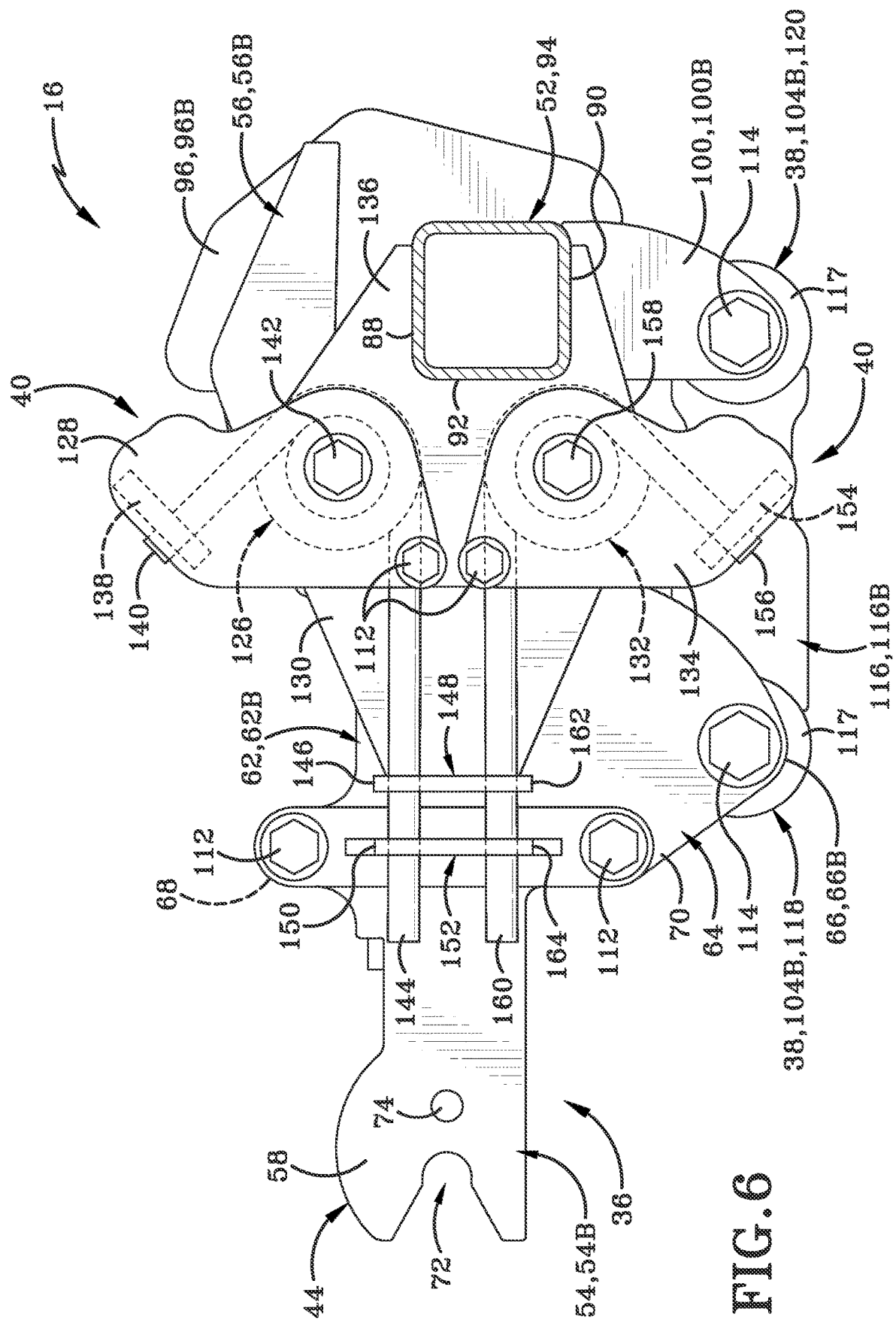
FIG. 6 is a right side elevation view looking in the direction of the line indicated in FIG. 4 according to one aspect of the present disclosure.
Figure 7:
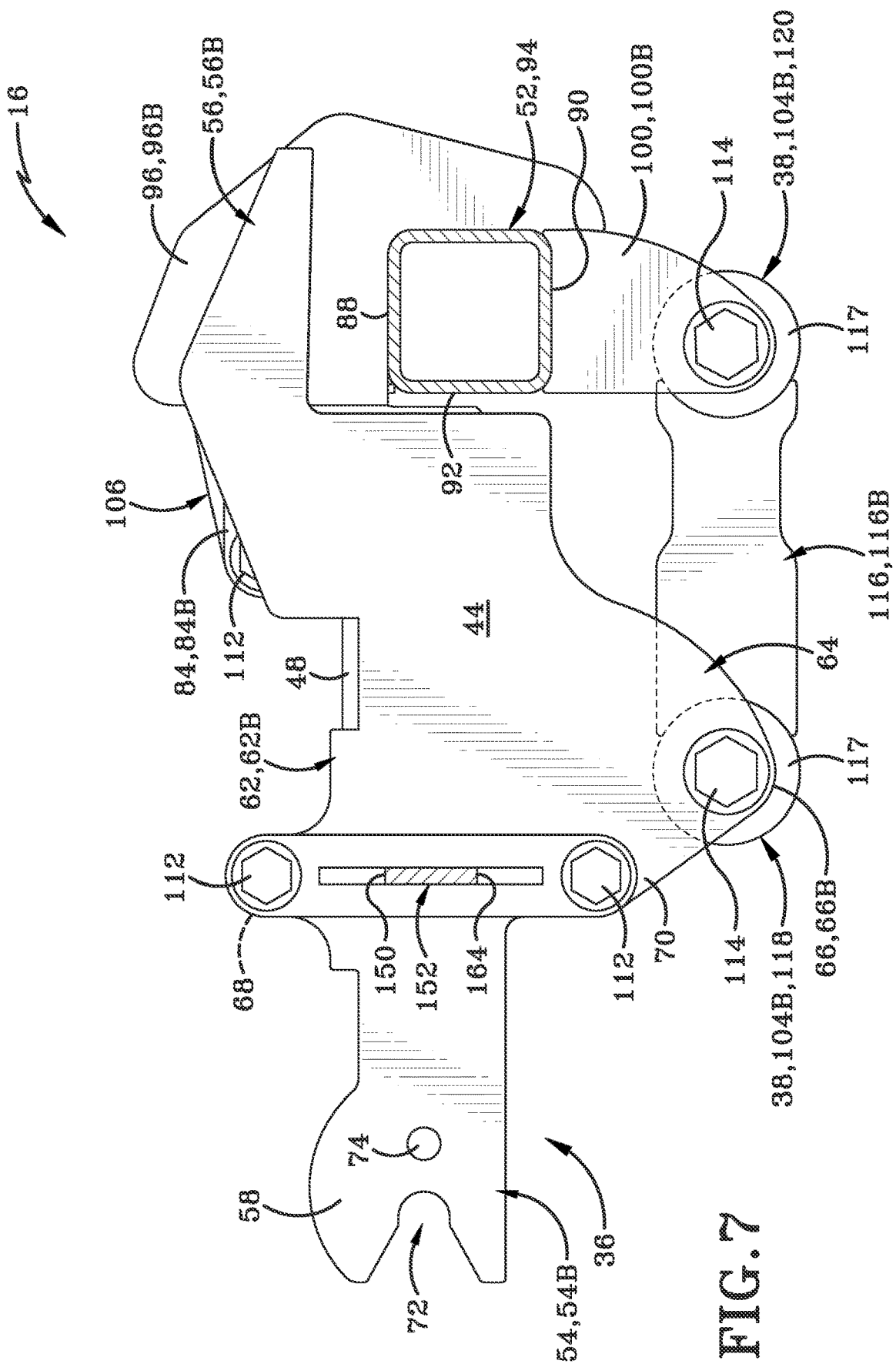
FIG. 7 is a right side elevation cross-sectional view looking in the direction of the line indicated in FIG. 4 according to one aspect of the present disclosure.
Figure 8:
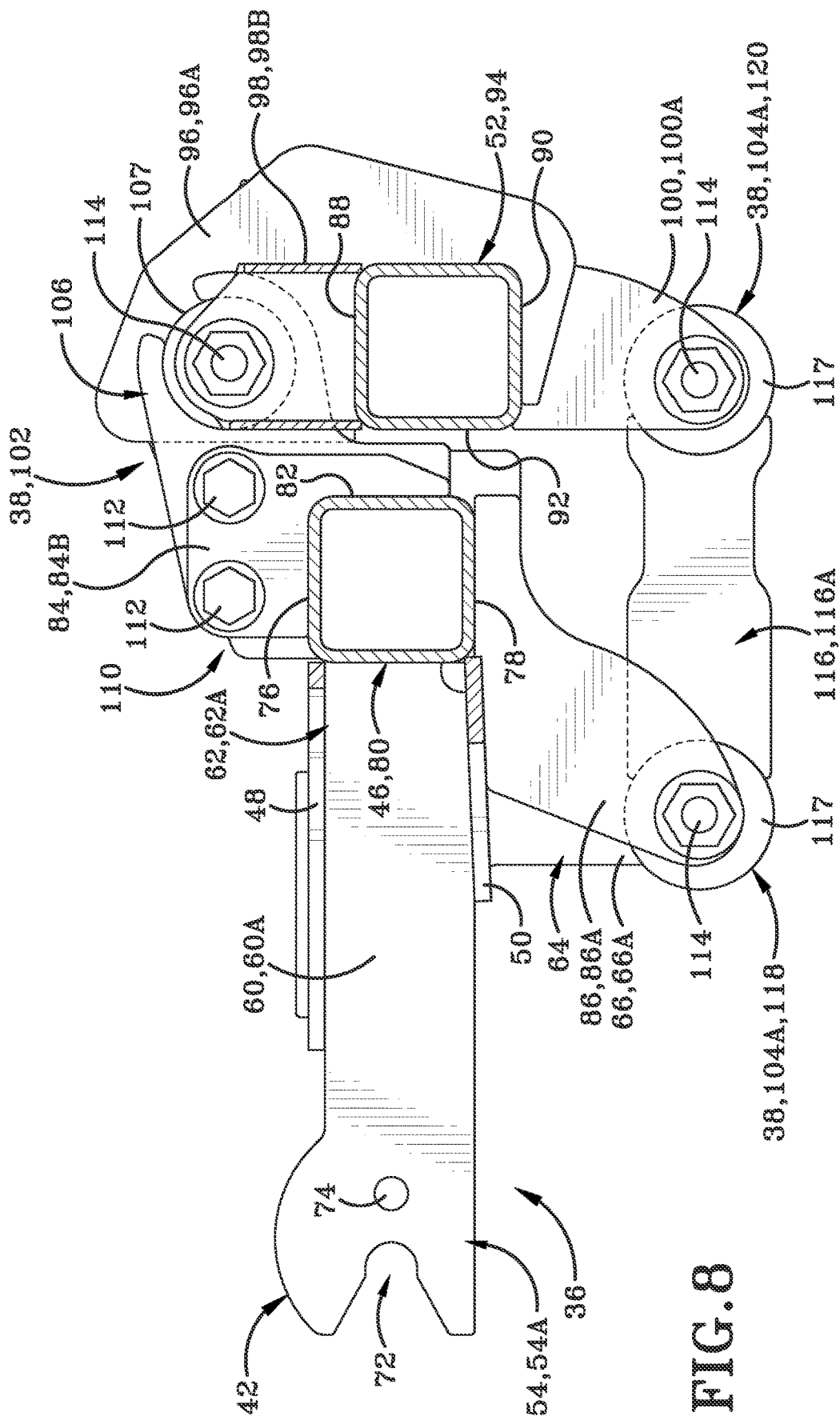
FIG. 8 is a right side elevation cross-sectional view looking in the direction of the line indicated in FIG. 4 according to one aspect of the present disclosure.

With continued reference to FIGS. 3-9, but as most easily seen in FIGS. 7 and 8, first and second side members 42, 44 include the rear arm 54, which may generally define the rearward most portion of first and second side members 42, 44, which may otherwise be understood to be the portion closest to tractor 14 and the portion that interacts with tractor frame 35. Rear arm 54 may be spaced apart from a front arm 56 and may define generally therebetween a longitudinal direction, which may be substantially parallel to center line C and substantially parallel to the direction of travel for tractor 14 when connected to an implement 12 via attachment frame assembly 16. Front arm 56 may extend forwardly and over second cross member 52 and may define a rotational maximum for second cross member 52 to prevent damage to implement 12 and to other components of attachment system 10, as discussed further herein. According to one aspect, front arm 56 may allow for a maximum of thirty degrees of rotation to either the left or the right side relative to the horizontal plane P, as discussed below.

First and second side members 42 and 44 may have an outer face 58 which may be generally oriented away from center line C and may have an inner face 60 oriented towards the center line C of attachment frame assembly 16. First and second side members 42 and 44 may further be oriented with front arm 56 at the top 62 of first and second side members 42 and 44. First and second side members 42 and 44 may further include a lower portion, or bottom 64, spaced vertically apart from top 62 which may include a lower pivot mount 66 for operational connection to lower pivot arms 116 as discussed further below. First and second side members 42 and 44 may be constructed of any suitable material including steel or other similar metals, or the like.

Second side member 44 may differ from first side member 42 in placement and orientation within frame 35, but also in the inclusion of upper and lower spring assembly mounts 68 and 70, respectively, for operational connection to second spring stop arm 152, as discussed further below. The upper and lower spring assembly mounts 68, 70 may be omitted from first side member 42 when spring assembly 40 is oriented to the second side of center line C. It will be understood; however, that in applications and/or implementations with spring assembly 40 mounted to the left side of center line C or in applications and/or implementations with more than one spring assembly 40 employed, first side member 42 may be modified or otherwise provided with similar spring assembly mounts 68, 70 as dictated by the specific implementation thereof and as discussed further herein.

First and second side members 42 and 44 may further include a rear mounting slot 72 and mounting pins 74 for use in a standard connection with tractor frame 35 of tractor 14. Both of first and second side members 42 and 44 may further include any shape or configuration for operation connection to the various components and need not be limited specifically to the configuration shown but instead may be modified according to the desired implementation.

First cross member 46 may extend laterally or transversely between first and second side members 42 and 44 and may include any suitable mounting hardware, as needed, to connect first cross member 46 to the inner faces 60A and 60B of first and second side members 42, 44, as needed. According to one aspect, first cross member 46 may be welded to the inner faces 60A, 60B of side members 42, 44. According to another aspect, first cross member 46 may be connected to side members 42 and 44 through any other suitable means, including but not limited to bolts, screws, rivets or the like. Alternatively, first cross member 46 may be integrally formed with first and second side members 42 and 44.

According to one aspect, first cross member 46 may be tubular with a square cross section as depicted in FIG. 8. According to another aspect, first cross member 46 may be formed from multiple separate components and/or may be a single member with any suitable cross section. Where first cross member 46 is chosen as a tubular member having a square or substantially square cross section, first cross member 46 may include a top face 76 spaced vertically apart from a bottom face 78 and a rear face 80 spaced longitudinally apart from a front face 82.

First cross member 46 may also include upper mounting flanges 84A and 84B extending upwards from top face 76, with upper mounting flange 84A just to the left of center line C and upper mounting flange 84B disposed just to the right of center line C such that center line C may pass between upper mounting flanges 84A and 84B. Upper mounting flanges 84A and 84B may be affixed to one or more of top face 76, front face 82, and/or bottom face 78 of first cross member 46 and may provide an attachment point to center pivot linkage 106, as discussed further below.

First cross member 46 may likewise include lower mounting arms 86A and 86B, which may extend downwards from bottom face 78 of first cross member for operational attachment to lower pivot mount 66A and 66B and lower pivot linkages 116A and 116B, as discussed further herein.

Upper and lower transverse supports 48 and 50 may be further connected to first cross member 46 and may extend between first and second side members 42 and 44 to provide support and additional structural integrity for first cross member 46 and first and second side members 42 and 44. According to one aspect, upper transverse support 48 may extend rearwardly from first cross member 46 and may be affixed through welding, adhesives, or any suitable attachment means to the rear face 80 of first cross member 46 and may be substantially planar with the top face 76 of first cross member 46. Upper support 48 may also be connected to or rest on top 62A and 62B of first and second side members 42 and 44, or alternatively may be affixed or connected to infer faces 60A and 60B thereof. Upper support 48 may be affixed or connected to first and second side members 42, 44 through any suitable means including welding, adhesives, bolts, rivets, screws, or any other suitable attachment mechanism.

Similarly, lower transverse support 50 may extend rearwardly from first cross member 46 and may be generally planar with the bottom face 78 of first cross member 46. As with upper support 48 and lower support 50 may be likewise affixed or otherwise attached to first and second side members 42 and 44 through any suitable means including welding, adhesives, bolts, rivets, screws, or any other suitable attachment mechanism. According to one aspect and as shown in the figures, upper and lower transverse supports 48 and 50 may be welded to first and second side members 42 and 44 and first cross member 46 which may include additional supports or welding points for structural integrity thereof.

Second cross member 52 may run substantially parallel to first cross member 46 and may likewise be formed as a tube having a square cross section. It will be similarly understood, however, that second cross member 52 may have any suitable shape and/or cross section. Second cross member 52 may be laterally symmetrical about center line C and may extend beyond the first and second side members 42 and 44, extending out to the outermost edges of implement 12. Where implement 12 is a flail mower, second cross member 52 may substantially define the back end of the flail mower.

Second cross member 52 may have a first end, which may be a left end, i.e. to the left of center line C and a second end, which may be a right end, for operational attachment to one or more frame components 32 of implement 12. According to one aspect, second cross member 52 may attach to frame components through removable means, as best seen in FIG. 2, such as bolts or the like. According the another aspect, second cross member 52 may be more permanently attached to frame components 32 of implement 12 such that second cross member 52 could be considered to be one of the frame components 32 of implement 12 and may attach and detach from mount frame 36 or, more particularly, from first cross member 46 as discussed further herein. According to this aspect, each implement 12 to be utilized with this attachment system 10 may have a separate second cross member 52 attached to a rearward end therefrom for operable attachment to and detachment from frame 16 and first cross member 46, as desired.

For purposes of this disclosure, second cross member 52 is depicted and described as a length of tubular steel having a square cross section (as best seen in FIGS. 6-9) which, again, is intended as a non-limiting example. According to this aspect, second cross member 52 may therefore have a top face 88 spaced vertically apart from a bottom face 90 and a rear face 92 spaced longitudinally apart from a front face 94. The length of cross member 52 may be determined based on the operational width of the implement 12 being used therewith and may vary according to the operational needs thereof.

Second cross member 52 may have upper mounting plates 96A and 96B, which may be affixed or attached to one or more of the top face 88, bottom face 90, and/or front face 94 of second cross member 52. Upper mounting plates 96 may be sized and configured to operably connect to upper pivot assembly 102, as discussed further below. Upper mounting plate 96A may be the mounting plate to the left of center line C while upper mounting plate 96B may be to the right of center line C. As best seen in FIG. 3, mounting plates 96A and 96B may be placed slightly further away from center line C than upper mounting flanges 84A and 84B of first cross member 46 such that mounting plates 96A and 96B are laterally outside of mounting flanges 84A and 84B. Mounting plates 96 may include a substantially U-shaped bracket 98 extending inwardly towards center line C which may further facilitate operable connection with upper pivot assembly 102, as discussed below. Brackets 98 may extend inwardly towards center line C such that the bottom of the U-shaped bracket 98 provides a mounting plane which is parallel to and substantially planar to mounting flanges 84A and 84B. This substantially shared plane may allow for proper alignment of pivot assembly 102 components.

As best seen in FIGS. 5 and 6, second cross member 52 may further include lower mounting arms 100 similar to mounting arms 86 (extending downward from bottom face 90 thereof). Specifically, lower mounting arms 100 may be arranged in pairs and affixed to and extended downward from second cross member 52 for operational connection to lower pivot assemblies 104A and 104B, and may be affixed or otherwise attached to bottom face 90 of second cross member 52 through any suitable means such as welding, adhesive, or other similar attachment methods.

Included in attachment frame assembly 16 are three pivot assemblies 38 namely, upper pivot assembly 102 and two lower pivot assemblies 104A and 104B. As discussed below, pivot assemblies 38 may work in unison to allow pivotal movement of second cross member 52 relative to first cross member 46 about substantially central and longitudinal axis generally defined by center line C. This rotation about this longitudinal axis may allow implement 12 to have vertical and lateral movement relative to first cross member 46.

Figure 4:
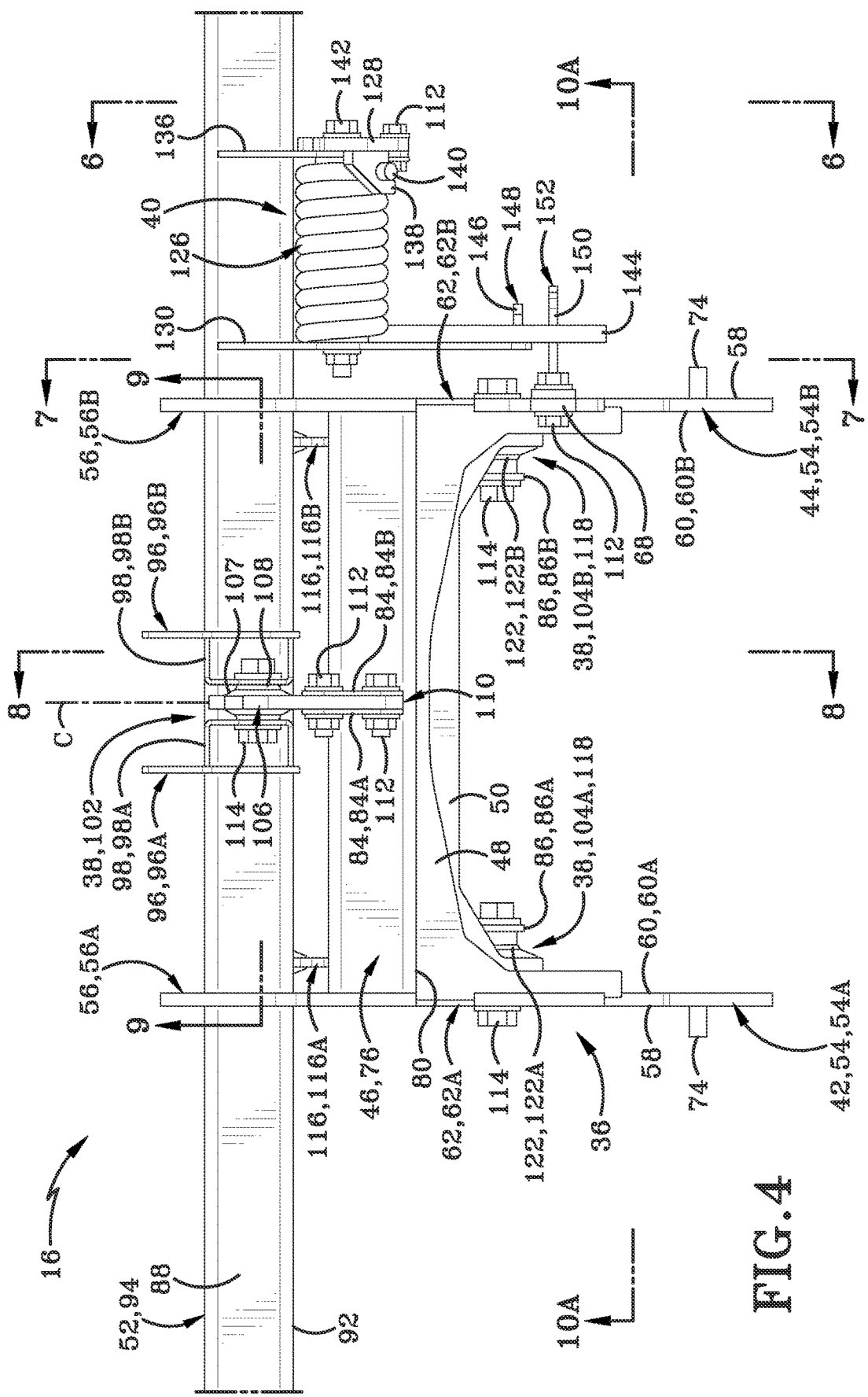
FIG. 4 is an overhead plan view of an attachment mechanism according to one aspect of the present disclosure.
Figure 9:
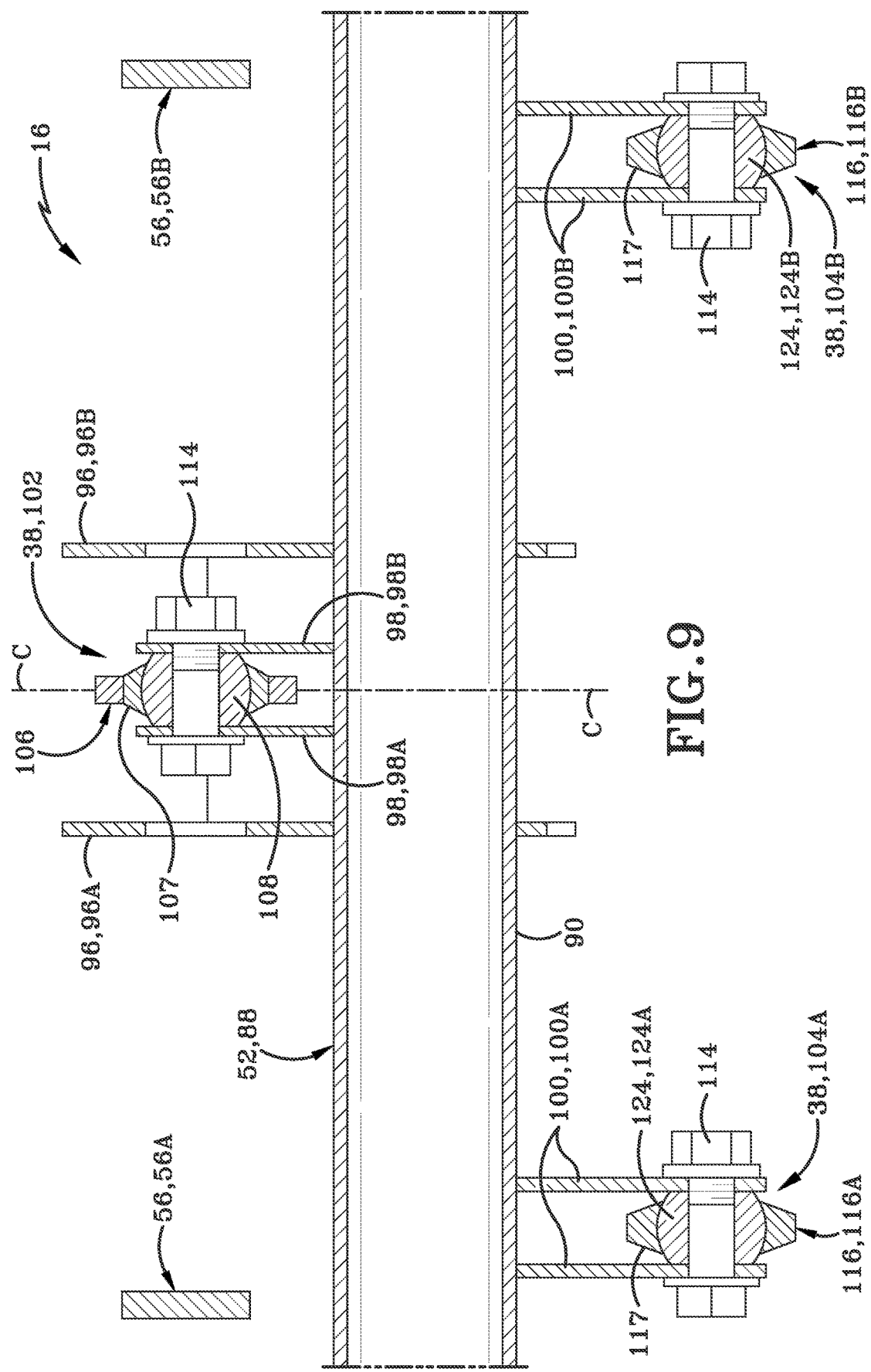
FIG. 9 is a rear elevation cross-sectional view looking in the direction of the line indicated in FIG. 4 according to one aspect of the present disclosure.

Upper pivot assembly 102 may be best seen in FIGS. 3, 4, and 9 and may include an upper pivot linkage 106 and an upper pivot ball 108. Pivot linkage 106 may be a longitudinally extending plate that may be secured on a rearward end 110 between upper mounting flanges 84A and 84B and secured in place therein by any suitable means including by bolts 112, as shown in the figures, or by any other suitable mechanism. According to another aspect, pivot linkage 106 may be welded and/or integrally formed with upper mounting flanges 84A and 84B as to constitute a single piece unit. Pivot linkage 106 may then extend forward and above second cross member 52 and may have a housing 107 formed in or fixed thereto that may contain upper pivot ball 108 therein. Housing 107 may be integrally formed with linkage 106, or may alternatively be fixedly connected thereto via welding or any other suitable attachment mechanism. Therefore, as used herein, further reference to pivot linkage 106 is understood to include housing 107 therewith, unless specifically stated otherwise. Upper pivot ball 108 may then be aligned with brackets 98A and 98B and secured thereto with a pivot bolt 114. Bolts 112 may differ from pivot bolts 114 in that bolts 112 may be designed or employed for securing two components together with no movement therebetween while pivot bolts 114 may be designed for securing a pivot ball such as upper pivot ball 108 or lower rear and front pivot balls 122 and 124 (discussed below) while not impeding or otherwise affecting the rotational movement thereof.

Upper pivot ball 108 may be a standard and commercially available hitch ball that may be secured within housing 107 in the pivot linkage 106 through known means including a tensioning screw or lock screw (not shown) or through any other suitable mechanism. According to one aspect, pivot ball 108 may be a ball joint commercially available from Danuser Machine Company or other similar type ball joints. Movement of pivot ball 108 within housing 107 of pivot linkage 106 may allow for partial rotational movement transverse to pivot linkage 106 and housing 107, as discussed herein with reference to the movement of implement 12 and second cross member 52 relative to first cross member 46.

With continued reference to FIGS. 3-9, but as best seen in FIGS. 5-9, lower pivot assemblies 104A and 104B may be substantially similar to each other (but for their placement in mount frame 36) and may include a lower pivot linkage 116, with 116A representing the lower pivot linkage 116 to the left of center line C and connected to first side member 42 and with 116B representing the lower pivot linkage 116 to the right of center line C and connected to second side member 44. Lower pivot linkages 116A and 116B may be rigid or semi-rigid and may extend longitudinally from a rearward end 118 (closest to the tractor 14) to a forward end 120 (furthest from the tractor 14). Lower pivot linkages 116A and 116B may include a housing 117 at each end 118 and 120 thereof connecting linkages 116A and 116B to a lower rear pivot ball 122 and a lower front pivot ball 124, respectively. As with linkage 106 and housing 107, lower linkages 116A and 116B may be integrally formed with housings 117 at each end, or may alternatively be fixedly connected thereto via welding or any other suitable attachment mechanism. Similarly, as used herein, further reference to pivot linkages 116A and 116B are understood to include housings 117, unless specifically stated otherwise. Rear and front pivot balls 122 and 124 may be substantially identical to each other and to upper pivot ball 108 of the upper pivot assembly 102 but for their location within pivot assemblies 38 and/or attachment frame assembly 16 overall.

Lower pivot linkages 116A and 116B may be sized such that rear pivot balls 122A and 122B may be aligned between the lower pivot mounts 66A and 66B of first and second side members 42 and 44 and the lower mounting arms 86A and 86B extending downward from first cross member 46, as previously discussed herein. Rear pivot ball 122 and lower pivot linkage 116 may then be secured in position by pivot bolts, such as pivot bolts 114 or the like.

Similarly, lower pivot linkages 116A and 116B may extend forward such that the front pivot ball 124 may be aligned with and between lower mount arm pairs 100A and 100B extending downward from second cross member 52 and may be secured therein via pivot bolts 114. This configuration, as best seen in FIG. 5, allows for pivot linkages 116 to be placed between first and second side members 42 and 44 closer to center line C while both allowing pivotal movement of second cross member 52 relative to first cross member 46 while also helping to support attachment frame assembly 16 for a more secure attachment between first and second cross members 46 and 52.

Lower pivot linkages 116 may permit rotational movement of second cross member 52 and implement 12 as discussed further herein, but may further limit or prevent movement in other directions. For example, the rigid nature of lover linkages 116 may prevent front-to-back or side-to-side movement of second cross member 52 and implement 12, while still allowing rotational movement about the pivot axis defined by centerline C, as discussed herein.

As previously discussed herein, the elements and components of attachment frame assembly 16 described up through this point in the disclosure may be generally symmetrical and/or mirror-imaged about center line C but for spring assembly 40, which may be placed to one side of center line C. As depicted in the figures and discussed herein, spring assembly 40 may be located to the right of center line C, outside of second side member 44. However, it will be understood that the positioning of spring assembly 40 could be reversed such that spring assembly 40 may be located to the left of center line C in a similar position outside of first side member 42. According to another aspect, where desired or advantageous, a second spring assembly 40 may be provided such that two spring assemblies 40 may be employed to either side of center line C. Therefore, the following discussion of such spring assembly 40 may be understood to be applicable to any configuration including configurations with a single spring assembly 40 as disposed on either side of center line C, or in configurations employing more than one spring assemblies 40. According to one aspect, where implement 12 includes a PTO system 24, as shown in the figures, the weight of that PTO system 24 may be offset wholly or in part but the placement of spring assembly 40 on the opposite side of implement 12. For example, where implement 12 is a flail mower having a PTO system 24 on the left side thereof, the placement of the spring assembly 40 on the right side thereof may further facilitate the weight balance about centerline C to keep implement level during transport and operation.

Spring assembly 40 may be, at its most basic, a biasing mechanism, which may bias the second cross member 52, and therefore implement 12, into a substantially level orientation wherein top face 88 of second cross member 52 is substantially coplanar with top face 76 of first cross member 46. As discussed further below, in relation to the operation of attachment system 10, the biasing force of spring assembly 40 ensures that rotational movement of second cross member 52 and thereby implement 12 only occurs when sufficient forces act upon implement 12 as to overcome the biasing force, thus reducing unwanted bouncing and/or unintentional rotation thereof.

Accordingly, spring assembly 40 may include an upper spring 126, an upper spring mount 128, a side plate 130, a lower spring 132, and a lower spring mount 134, Upper and lower spring mounts 128, 134 may be connected to a spring mount plate 136.

Upper spring 126 may be any suitable spring, such as a torsion spring, and may be coiled around a centrally located upper spring bolt 142, which may substantially define a pivot axis about which upper spring 126 may rotate when force is applied. Upper spring mount 128 may further include an upper spring catch flange 138 which may interact with a first leg 140 of upper spring 126. A second leg 144 of upper spring 126 may then extend rearwardly from the upper spring 126 coil and may interact with a top edge 146 of first spring stop arm 148 and a top edge 150 of second spring stop arm 152. The combination of first and second spring stop arms 148, 150, and the upper spring catch flange 138 may keep the legs 140, 144 of upper spring 126 under tension to provide downward biasing force to the second cross member 52 and implement 12. This downward biasing force may be in the rotational direction opposite arrows AA, BB, and CC shown in FIGS. 11A-11C.

Similarly, lower spring 132 may be any suitable spring, such as a torsion spring, and may be coiled around a centrally located lower spring bolt 158, which may substantially define the pivot axis about which lower spring 132 may rotate when force is applied. Lower spring mount 134 may further include a lower spring catch flange 154 which may interact with a first leg 156 of lower spring 132. A second leg 160 of lower spring 132 may then extend rearwardly from the lower spring 132 coil and may interact with a bottom edge 162 of first spring stop arm 148 and a bottom edge 164 of second spring stop arm 152. The combination of first and second spring stop arms 148, 150, and the lower spring catch flange 154 may keep the legs 156, 160 of lower spring 132 under tension to provide upward biasing force to the second cross member 52 and implement 12. This upward biasing force may be in the rotational direction opposite arrows DD, EE, and FF shown in FIGS. 12A-12C.

Spring assembly 40 may be carried by second cross member 52 such that side plate 130 and spring mount plate 136 may be welded or otherwise attached to one or more of top face 88, rear face 92 and/or front face 94 of second cross member 52 for support thereof. Upper and lower spring bolts 142 and 158 may then be operable to connect upper spring mount 128, lower spring mount 134 and spring mount plate 136 to side plate 130 while also extending through the coils of upper and lower springs 126 and 132 to secure upper and lower springs 126, 132 in position between the spring mounts 128, 134 and side plate 130. Additional bolts or attachments may be provided to further secure spring assembly 40 together. For example, as depicted in FIG. 3, additional bolts 112 may be employed to further secure spring mounts 128, 134 to spring mount plate 136.

Side plate 130 may then extend rearwardly from second cross member 52 and may include first spring stop arm 148 thereon, such that side plate 130 and first spring stop arm 148 may form an integral unit. Other than second spring stop arm 152, spring assembly 40 may be entirely disconnected from mount frame 36 and/or pivot assemblies 38 but for the interaction of upper and lower springs 126 and 132 with second spring stop arm 152. Second spring stop arm 152 may be disconnected from the remainder of spring assembly 40 in that it may be attached to, or otherwise carried by, outer face 60B of second side member 44 at the upper spring assembly stop mount 68 and lower spring assembly top mount 70, as discussed previously herein.

As discussed further below in more detail, the interaction of second arm 144 of upper spring 126 and second arm 160 of lower spring 132 with first and second spring stop arms 148 and 152 may provide the aforementioned biasing force to attachment frame assembly 16.

Having thus described the elements and components of attachment system 10, the operation and advantages thereof will not be discussed.

With reference to FIG. 10A through FIG. 12C, attachment system 10 is shown in various operational configurations. At its most basic, attachment system 10 provides a longitudinal pivot axis that is generally defined by the center line C of attachment frame assembly 16. This central axis is parallel to and generally defines the direction of travel for tractor 14 with implement 12 and attachment frame assembly 16 connected thereto.

With current or previous systems, when tractor is operated on a substantially even or flat ground surface, an implement attached thereto would remain horizontally level and may follow the ground; however, in such prior systems, when the ground surface is uneven or slanted, these current implements maintain their level orientation relative to tractor, not relative to ground. Accordingly, when the ground surface is slanted or uneven, one side of an implement connected thereto may be operated at a different height relative to the ground surface, which may cause an uneven application of the implement. Where the implement is, as discussed herein, a flail mower (or other mowing attachment), this may result in uneven cut height and/or damage to the ground surface as the current systems do not allow for horizontal adjustment. According to one simplified example, where the ground surface is sloped downwards right to left from the perspective of the operator of the tractor, a current system would provide that the right of the implement would remain in contact with the ground surface while the left side may raise up and may no longer contact the ground surface. Accordingly, current systems either result in uneven application of the implement, or alternatively tend to require multiple passes from multiple angles on uneven or sloped terrain to achieve a uniform application and result. Multiple passes; however, require additional time, expense, and danger as the additional passes and angles increase the chance of an accident occurring due to the uneven terrain and the number of times that terrain must be traversed.

With the attachment system 10 of the present disclosure, an implement 12 may be operated to more closely follow or track the terrain on which it is being used to provide a more consistent and level application of the implement regardless of the level and/or slope of that terrain.

Figure 10A:
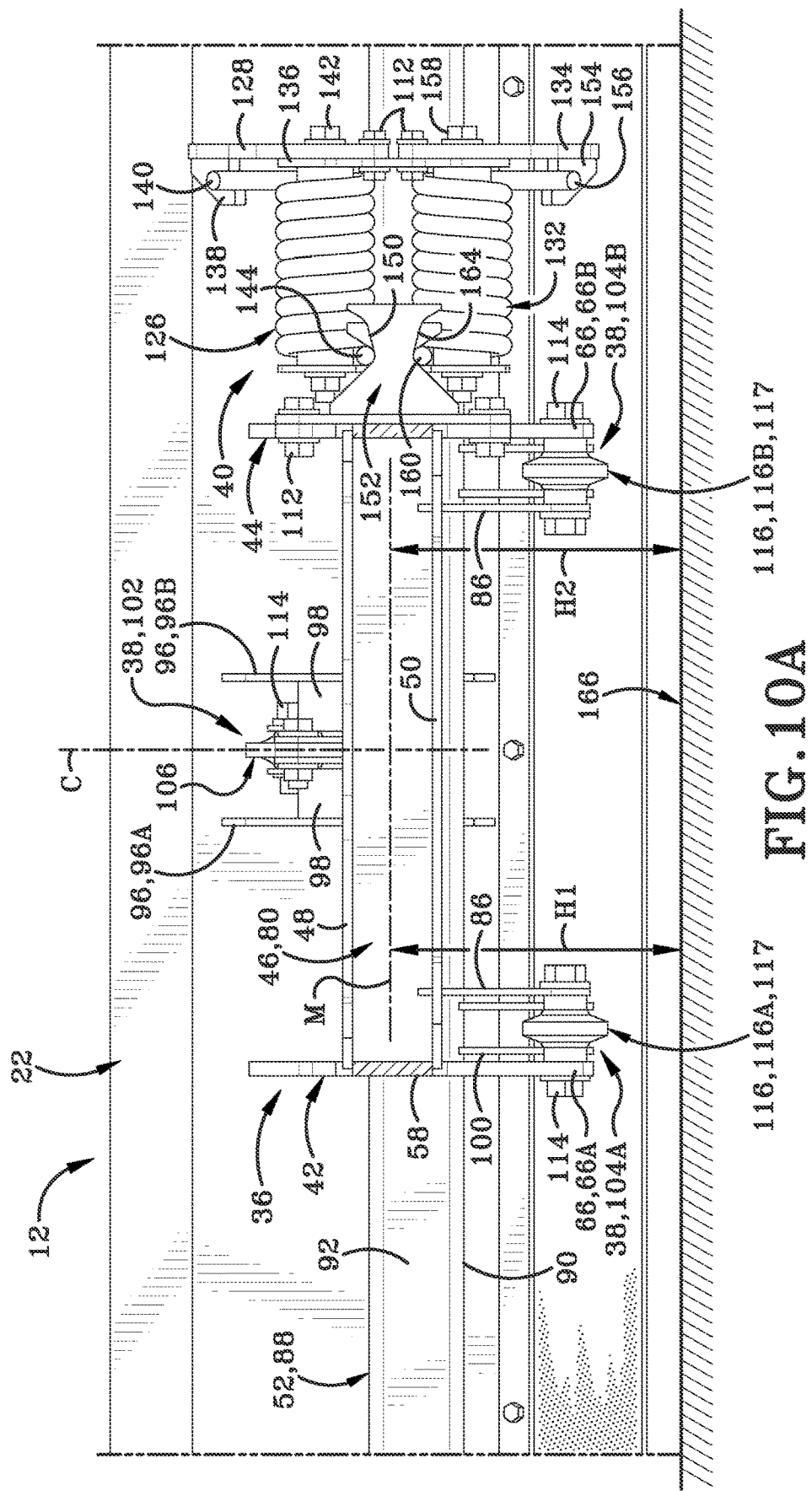
FIG. 10A is a rear partial cross-sectional view looking in the direction of the line indicated in FIG. 4 according to one aspect of the present disclosure.
Figure 10B:
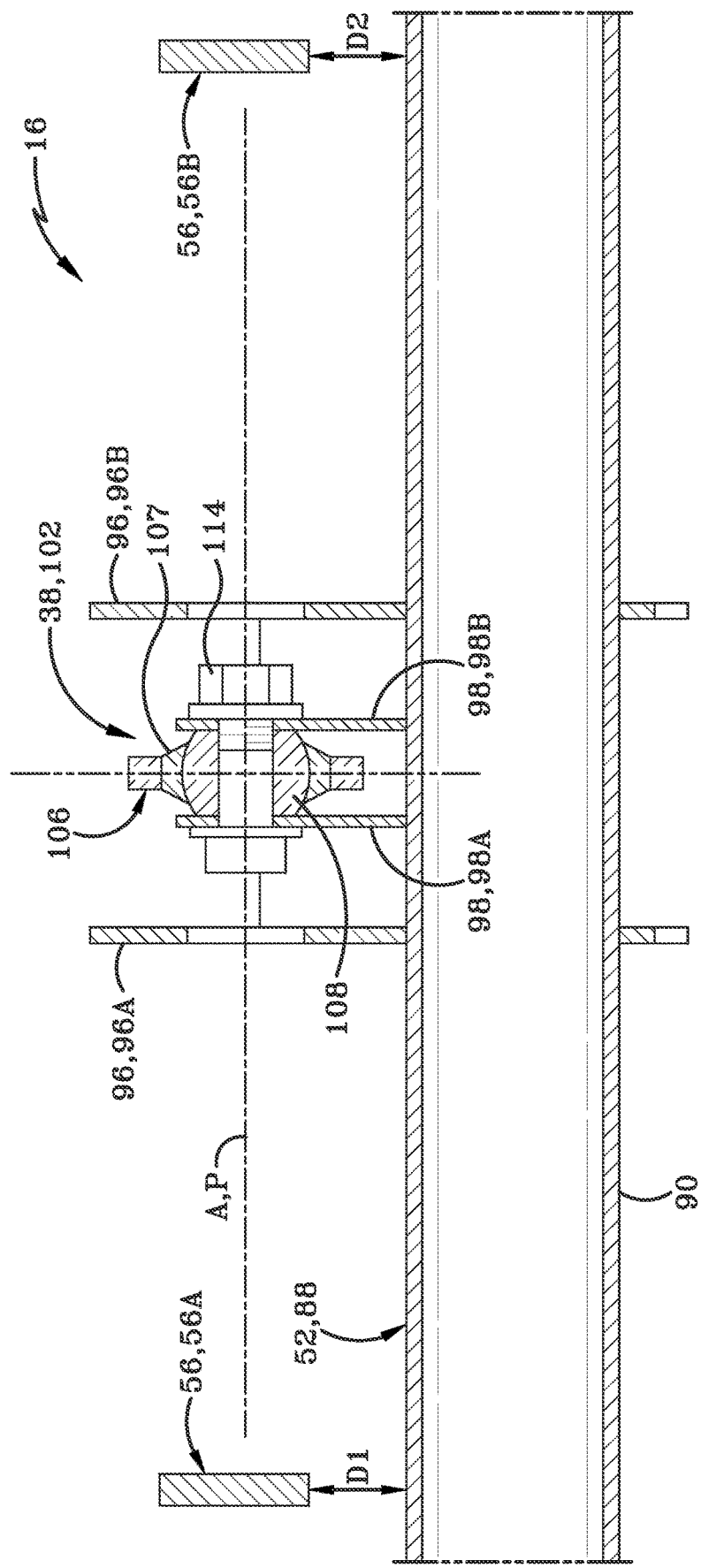
FIG. 10B is a rear cross-sectional operational view of a pivot assembly of an attachment mechanism according to one aspect of the present disclosure.

With reference then to FIG. 10A and FIG. 10B, when operated on a level and even surface, implement 12 may be generally maintained in a horizontal and level position by spring assembly 14. This generally horizontal or level position may be a first position of the implement 12 and is based on the position of an imaginary midline M that laterally bisects first cross member 46, as seen in the figures, to the ground surface 166 on which the implement 12 is being operated, and not relative to the tractor 14. Specifically, the horizontal position is considered when the height H1 of the midline M relative to the ground surface 166 on the left side of first cross member 46 is equal to height H2 relative to the ground surface 166 on the right side thereof, as best seen in FIG. 10A.

As best seen in FIG. 10B, a horizontal axis A defined by pivot bolt 114 in upper pivot assembly 102 may be substantially parallel to the midline M of first cross member 46. Further, the distance D1 between the top face 88 of second cross member 52 and the forward arm 56A of first side member 42 is equal to the distance D2 between the top face 88 of second cross member 52 and the forward arm 56B of second side member 44 when in this first position.

In the horizontal first position in particular, upper spring 126 may be positioned to provide biasing force on the top edges 146 and 150 of first and second spring stop arms 148 and 152, respectively. This may maintain the top edges 146 and 150 in generally a level position wherein the top edges 146 and 150 are substantially positioned in the same plane. Likewise, lower spring 132 may provide biasing force to the bottom edges 162 and 164 of first and second spring stop arms 148 and 152, respectively. Again, biasing these spring stop arms 148 and 152 into a position wherein the bottom edges 162 and 164 thereof are aligned and generally coplanar. Thus, in this position, both first and second cross members 46 and 52 are generally parallel and level relative to each other while upper pivot ball 108 is maintained in a generally level position.

Figure 11A:
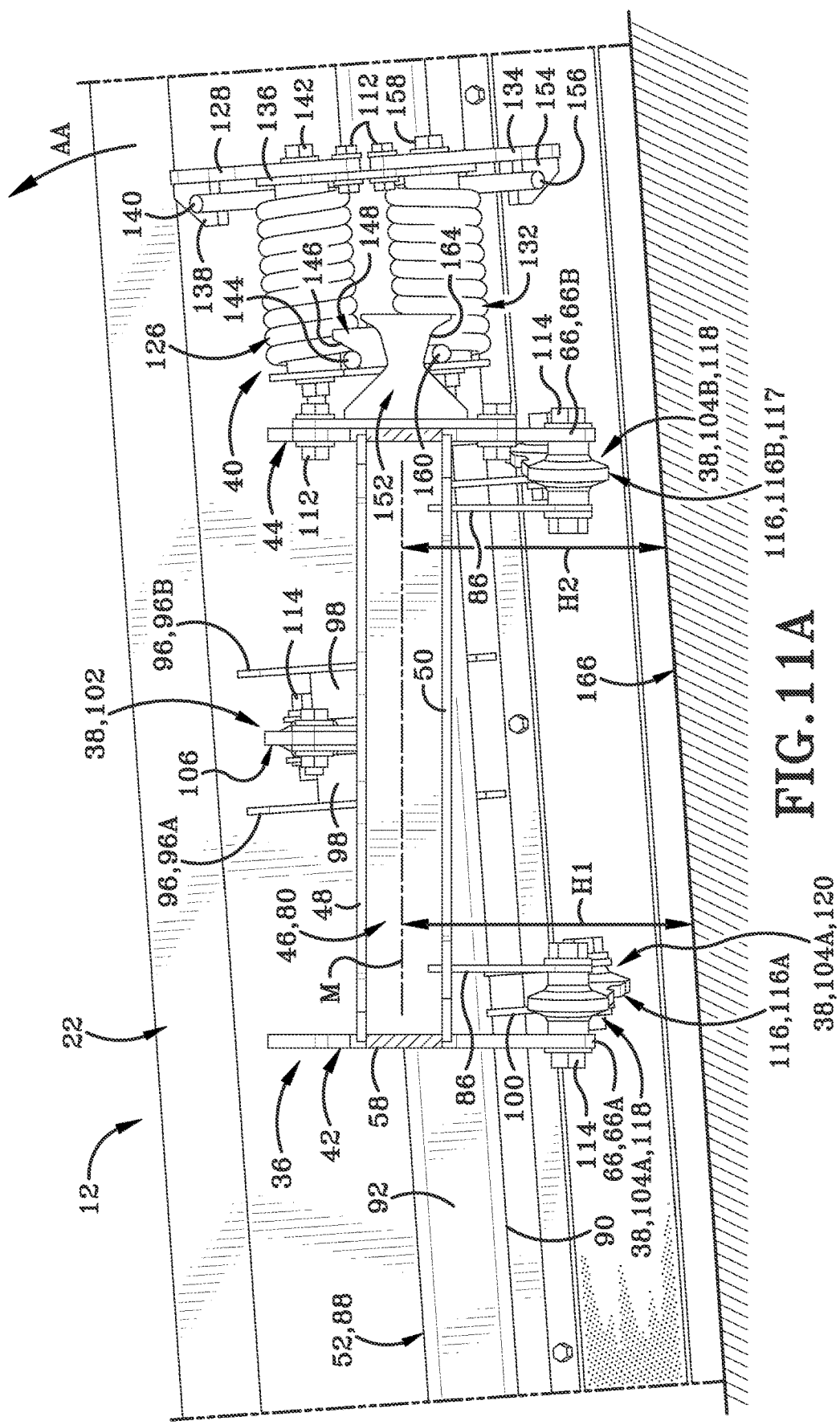
FIG. 11A is a rear elevation operational view of an attachment mechanism according to one aspect of the present disclosure.
Figure 11C:
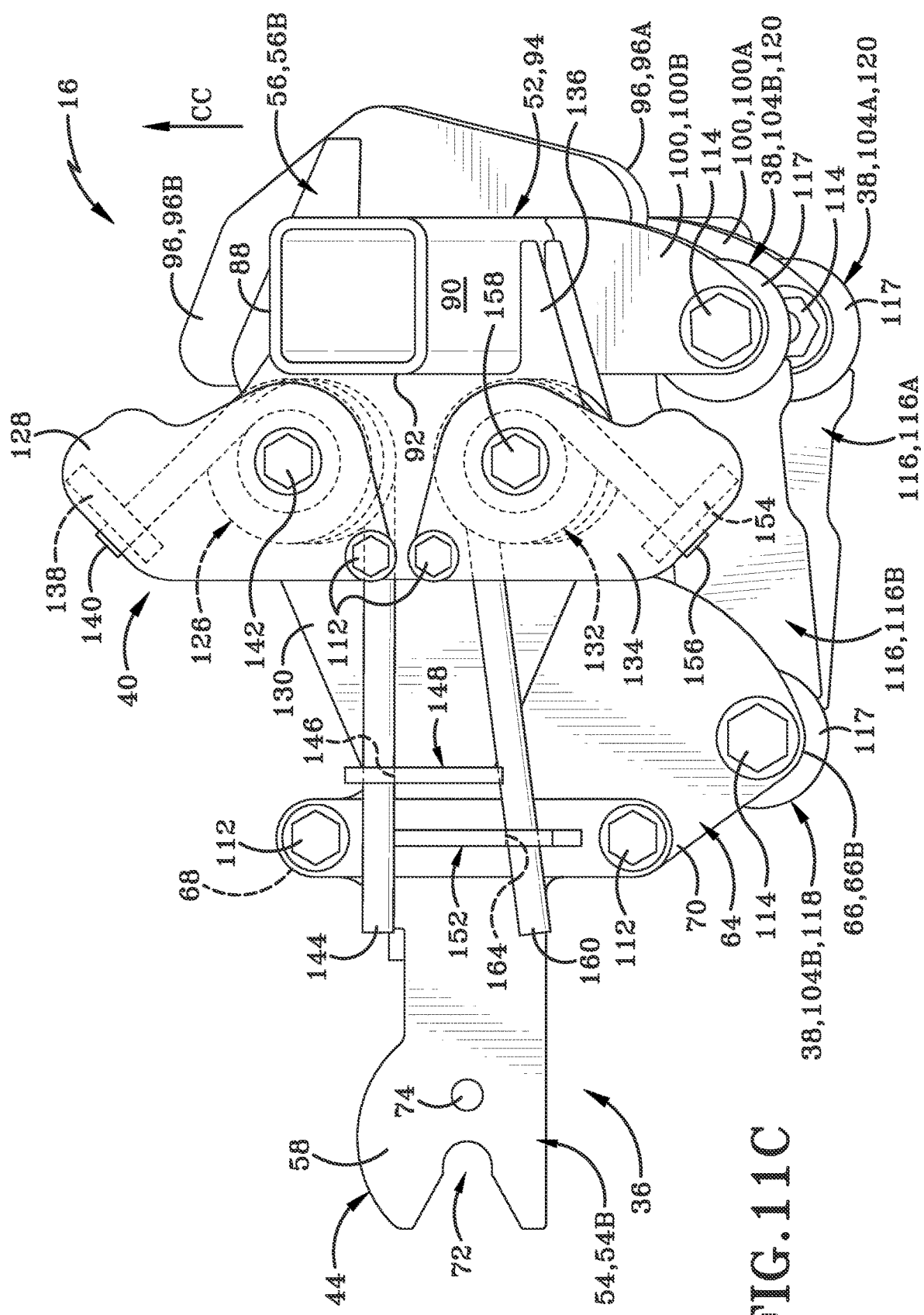
FIG. 11C is a left side elevation operational view of an attachment mechanism according to one aspect of the present disclosure.

With reference to FIG. 11A through FIG. 11C, when the implement 12 is operated on a slope or on uneven ground wherein the right side (again from the perspective of the operator on tractor 14) is higher than the left side of implement, the ground surface may cause force to be applied to the right side wheel 18 and/or skids 20 of implement 12, thus driving the right side up in the direction of arrow AA as seen in FIG. 11A. In this configuration, the right side of implement 12 may be raised while causing the left side of implement 12 to be lower relative to the tractor 14; however, relative to the ground surface, the height H1 of midline M of first cross member 46 is larger than height H2, thus providing that first cross member 46 is angled relative to the ground surface 166, while second cross member 52 (and thereby implement 12) maintains contact with and is level relative to the ground surface 166. Put another way, second cross member 52 and implement 12 track the ground surface while the first cross member 46 remains fixed relative to the tractor 14. In this position, which may be a second position of the implement 12, the second cross member 52 may likewise be angled relative to the first cross member 46.

As best seen in FIG. 11B, horizontal axis A defined by pivot bolt 114 in upper pivot assembly 102 may now be angled in a first direction relative to midline M of first cross member 46. This angle (represented by angle A1 defined above plane P, representing a parallel plane to midline M) may vary depending upon the slope of the ground surface 116, with the maximum angle being defined by the position of forward arm 56B in this first direction. According to one aspect, angle A1 may have a maximum value of thirty degrees above the horizontal plane P. According to another aspect, angle A1 may be any value between zero and approximately thirty degrees above the horizontal plane P, as defined by the placement of forward arm 56B and the amount of upwards force applied to the right side of implement 12. When implement 12 and second cross bar 52 are rotated as shown in FIGS. 11A-11C, the distance D1 between the top face 88 of second cross member 52 and the forward arm 56A of first side member 42 is greater than the distance D2 between the top face 88 of second cross member 52 and the forward arm 56B of second side member 44.

Further, in this second position shown in FIGS. 11A-11C, the ground surface may exert sufficient force on the right side of implement 12 to overcome the biasing force asserted by upper spring 126, thus driving the first spring stop arm 148 upwards and moving the second arm 144 of upper spring 126 from its position wherein it is engaged with the top edge 150 of second spring stop arm 152. This may allow rotational movement of pivot balls 108, 122A, 122B, 124A, and 124B as well as the related angular movement of the related pivot linkages 106, 116A, and 116B.

When the implement is returned to more even or level ground, the biasing force provided by upper spring 126 of spring assembly 40 may cause the implement to return to a substantially horizontal or level position (e.g. to the first position as seen in FIG. 10A).

Figure 12A:
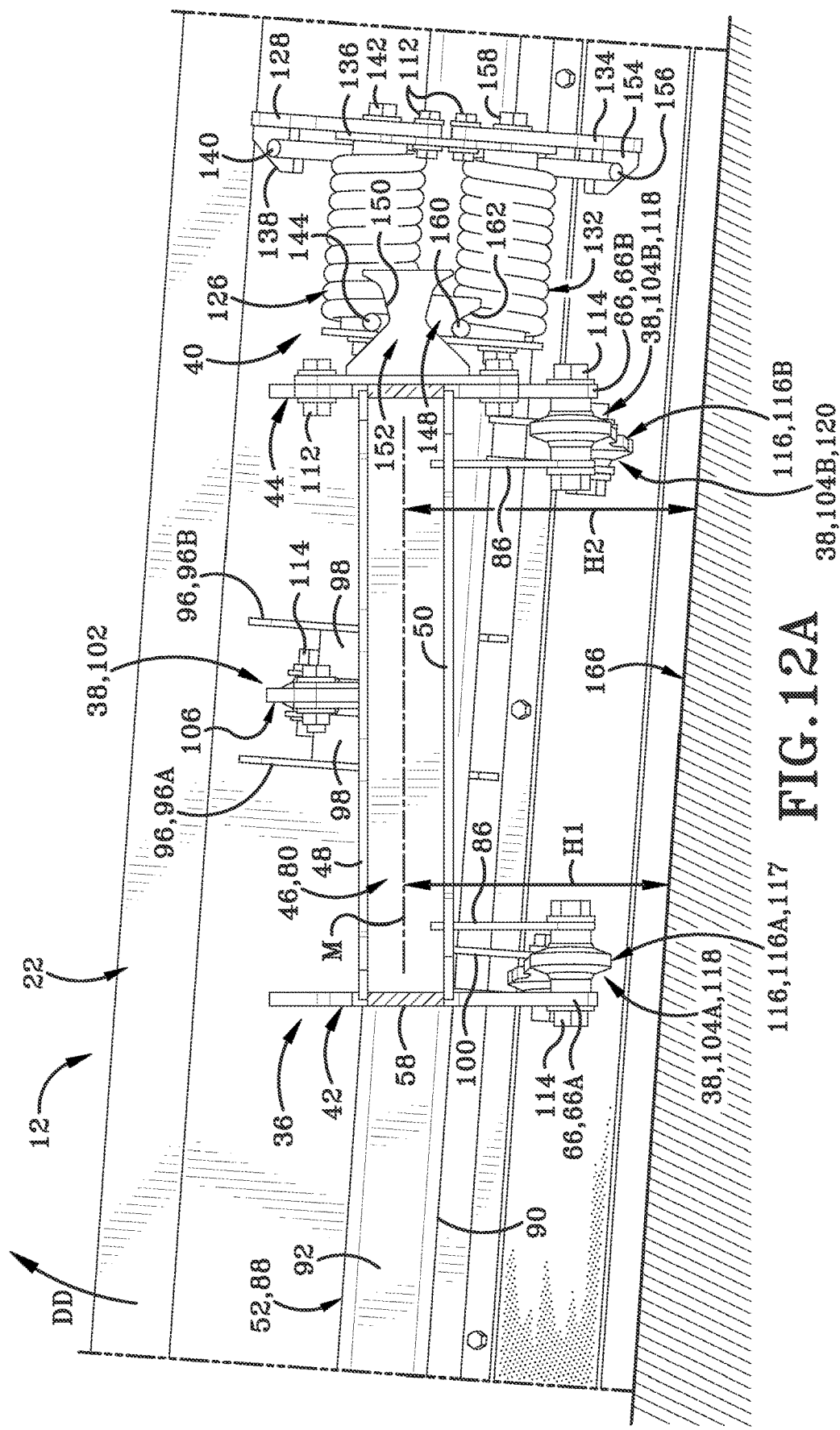
FIG. 12A is a rear elevation operational view of an attachment mechanism according to one aspect of the present disclosure.
Figure 12C:
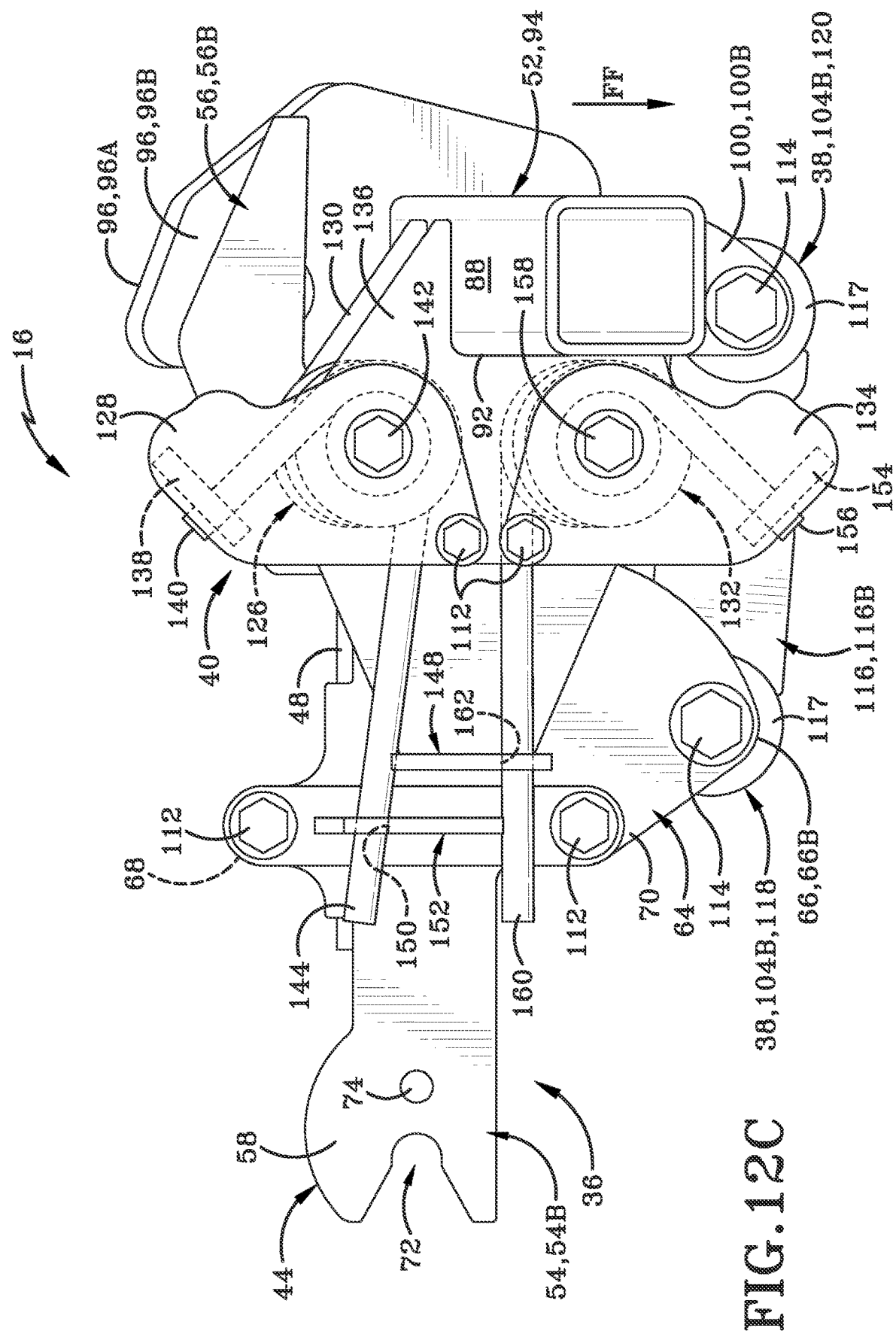
FIG. 12C is a left side elevation operational view of an attachment mechanism according to one aspect of the present disclosure.

With reference to FIG. 12A through 12C, when implement 12 is then operated on a ground surface 166 wherein the left side (again relative to the view of the operator of tractor 14) is higher than the right side, the ground surface 166 may similarly exert force on the left side of implement 12, thus causing the left side to rotate upwards in the direction of arrow DD in FIG. 12A. Again, in this position, which may be a third position, first cross member 46 may maintain a fixed orientation relative to tractor 14, but may be angled relative to ground surface 166 as illustrated by the fact that height H1 of midline M on the left side is now smaller than height H2 on the right, relative to the ground surface 166, as seen in FIG. 12A. As with the second position, in this third position, second cross member 52 is likewise angled relative to first cross member 46, albeit in a direction opposite that of the second position.

As best seen in FIG. 12B, horizontal axis A defined by pivot bolt 114 in upper pivot assembly 102 may now be angled in a second direction relative to midline M of first cross member 46. This angle (represented by angle A2, again defined above plane P) may vary depending upon the slope of the ground surface 116, with the maximum angle being defined by the position of forward arm 56A in this second direction. According to one aspect, angle A2 may have a maximum value of thirty degrees above the horizontal plane P. According to another aspect, angle A2 may be any value between zero and approximately thirty degrees above the horizontal plane P, as defined by the placement of forward arm 56A and the amount of upwards force applied to the left side of implement 12. When implement 12 and second cross bar 52 are rotated as shown in FIGS. 12A-12C, the distance D1 between the top face 88 of second cross member 52 and the forward arm 56A of first side member 42 is less than the distance D2 between the top face 88 of second cross member 52 and the forward arm 56B of second side member 44.

In this third position, the force exerted from the ground surface on the left side of implement 12 may overcome the biasing force of lower spring 132, again causing a separation of the first spring stop arm 148 and second spring stop arm 152, such that the top and bottom edges 146, 150, 162 and 164 thereof are no longer co-planar. Again, as discussed above, this may likewise cause pivot balls 108, 122A, 122B, 124A, and 124B to rotate and pivot linkages 106, 116A, and 116B to move angularly to allow for the rotation of implement 12. When implement 12 is returned to a level surface, the biasing forces applied by spring assembly 40 will again cause implement 12 to return to a horizontal and level position (e.g. FIG. 10A).

The use of biasing springs 126, 132 helps ensure that implement 12 does not bounce when encountering small or minor imperfections or obstructions, thus preventing an uneven application of implement 12. For example, where implement 12 is again a flail mower, without the biasing force of spring assembly 40, when a wheel 18 encounters a rock or a small depression it may cause implement 12 to bounce, thus affecting the cut height momentarily and resulting in an uneven cut, or uneven spot. Accordingly, the presence of spring assembly 40 helps ensure that implement 12 remains both level relative to the ground surface, i.e. parallel to the ground surface, while also maintaining its position without bouncing or "slop" in the application thereof.

Additionally, the inclusion of spring assembly 40 may ensure that the transitions of implement 12 and second cross member 52 between positions may be incremental and continuous as tractor 14 and implement 12 traverse the ground surface 166 and as the ground surface changes in condition (i.e. as ground surface 166 changes between level, sloped, uneven, and/or any combinations thereof).

Similarly, the inclusion of spring assembly 40 and the biasing forces provided therefrom may allow implement 12 to maintain a level orientation when raised for transport but not otherwise in operation. In this instance, this would prevent the edges or sides of implement from contacting the ground when cornering or turning the tractor 14 but otherwise not employing or operating the implement 12.

While spring assembly 40 may generally maintain the rotational positions of implement 12 and second cross member 52 relative to first cross member 46, there may be instances where the slope of the ground surface 166 exceeds the rotational capability of implement 12 and second cross member 52. In these instances, the inclusion of forward ends 56 of first and second side members 42 and 44, and their positioning over second cross member 52, may function as a rotational maximum stop. Put another way, forward ends 56 of side members 42, 44 may prevent over-rotation of implement 12 and second cross member 52 by mechanically blocking second cross member 52 from rotating beyond the structural limits of mounting frame 36, pivot assemblies 38, and/or spring assembly 40, thus preventing damage thereto.

Accordingly, the advantages of the present attachment system 10 include that the tractor 14 and implement 12 need fewer operational passes over an area with uneven or sloped terrain, thus reducing time, cost, maintenance, and danger, while simultaneously providing for a uniform application of the implement 12 to the operational area. Further, the present system 10 has the advantage of reducing or eliminating the need or motivation to loosen or modify connections, thus increasing safety for the operator and/or bystanders, while also providing for less wear, resulting in a longer life for the implement 12, tractor 14, and attachment frame assembly 16.

While described herein with regards to forward mounted implements, it will be understood that similar principles may be applied for side or rearward mounted implements. It will be further understood that the operation may change slightly for implements other than flail mowers; however, the same principles as discussed herein will still apply.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An attachment frame for a tractor mounted implement comprising:
    a first side member operable to connect to a frame of a tractor;
    a second side member spaced laterally apart from the first side member operable to connect to the frame of the tractor;
    a first cross member disposed between the first and second side members; and
    a second cross member forward of and connected to the first cross member operable to connect an implement to the first cross member, wherein the second cross member and the implement are rotatable relative to the first cross member about a longitudinal axis defined by a longitudinal centerline of the attachment frame.

2. The attachment frame of claim 1 wherein the second cross member is connected to the first cross member by at least one pivot assembly.

3. The attachment frame of claim 2 wherein the at least one pivot assembly is an upper pivot assembly further comprising:
    a pivot linkage connected to the first cross member on a first end thereof;
    a pivot ball carried by the pivot linkage at a second end thereof; and
    at least one pivot bolt operable to connect the pivot ball and second end of the pivot linkage to the second cross member.

4. The attachment frame of claim 2 wherein the at least one pivot assembly further comprises:
    an upper pivot assembly connecting a top face of the first cross member to a top face of the second cross member; and
    at least one lower pivot assembly connecting a bottom face of the first cross member to a bottom face of the second cross member.

5. The attachment frame of claim 4 wherein the at least one lower pivot assembly further comprises:
    a pivot linkage extending between the first cross member and the second cross member;
    a first pivot ball connected to a rearward end of the pivot linkage operable to connect the pivot linkage to the first cross member; and
    a second pivot ball connected to a forward end of the pivot linkage operable to connect the pivot linkage to the second cross member.

6. The attachment frame of claim 1 further comprising:
    a spring assembly carried by the second cross member operable to bias the second cross member into a horizontal position that is substantially parallel to the first cross member.

7. The attachment frame of claim 6 wherein the spring assembly further comprises:
    an upper spring operable to bias the second cross member towards the horizontal position when upward force is applied to a first side of the second cross member; and
    a lower spring operable to bias the second cross member towards the horizontal position when upward force is applied to a second side of the second cross member.

8. The attachment frame of claim 6 further comprising:
    a power system carried by the second cross member on a first side thereof and in operable communication with the tractor and the implement.

9. The attachment frame of claim 8 wherein the spring assembly is positioned on the second cross member on a second side thereof to laterally offset a weight of the power system on the first side of the second cross member.

10. The attachment frame of claim 1 wherein the implement is operable to follow the contour of a ground surface via the rotation of the implement and second cross member relative to the first cross member.

11. The attachment frame of claim 10 wherein the implement is a flail mower.

12. A method of maintaining a level orientation of an implement relative to a ground surface comprising:
    traversing a ground surface in a first condition with a tractor carrying an implement thereon;
    traversing the ground surface in a second condition with the tractor and implement;
    rotating the implement about a longitudinal axis defined by a centerline of an attachment frame connecting the implement to the tractor from a first position wherein the implement is generally horizontal relative to a cross member of the attachment frame to a second position wherein the implement is angled relative to the cross member of the attachment frame in response to the change of the ground surface from the first condition to the second condition; and
    biasing the implement back to the first position with a spring assembly when the level of the ground surface reverts to the first condition; wherein the spring assembly is entirely placed on a single side of the attachment frame relative to the centerline of the attachment frame.

13. The method of claim 12 further comprising:
traversing the ground surface in a third condition; and
rotating the implement from one of the first position and the second position to a third position wherein the implement is angled relative to the cross member of the attachment frame in an opposite direction than the second position.

14. The method of claim 13 wherein rotating the implement between the first, second, and third positions is incremental and continuous as the tractor traverses over the ground surface in all conditions.

15. The method of claim 12 wherein the implement is a flail mower.

16. The method of claim 12 wherein biasing the implement with the spring assembly further comprises:
biasing the cross member towards the first position when upward force is applied to a first side of the implement with an upper spring of the spring assembly.

17. The method of claim 16 wherein biasing the implement with the spring assembly further comprises:
biasing the cross member towards the first position when upward force is applied to a second side of the implement with a lower spring of the spring assembly.

18. The method of claim 12 wherein rotating the implement about the longitudinal axis further comprises:
rotating the implement relative to the cross member about at least one pivot assembly connected to the cross member on a first end thereof and to the implement on a second end thereof.

19. The method of claim 17 wherein rotating the implement relative to the cross member about the at least one pivot assembly further comprises:
connecting a pivot ball and a second end of a pivot linkage of the pivot assembly to the implement; and rotating the pivot ball about the longitudinal axis by applying upward force to one of a first side and a second side of the implement.

20. The method of claim 19 wherein rotating the pivot ball about the longitudinal axis further comprises:
rotating the implement up to thirty degrees to one of the left and the right relative to the cross member.

21. An attachment frame for a tractor mounted implement comprising:
a first side member operable to connect to a frame of a tractor;
a second side member spaced laterally apart from the first side member operable to connect to the frame of the tractor;
a first cross member disposed between the first and second side members;
a second cross member operable to connect an implement to the first cross member; and
at least one pivot assembly connecting the first cross member and the second cross member with one another, the at least one pivot assembly comprises:
a pivot linkage connected to the first cross member on a first end thereof;
a pivot ball carried by the pivot linkage at a second end thereof; and
at least one pivot bolt operable to connect the pivot ball and second end of the pivot linkage to the second cross member.

22. An attachment frame for a tractor mounted implement comprising:
a first side member operable to connect to a frame of a tractor;
a second side member spaced laterally apart from the first side member operable to connect to the frame of the tractor;
a first cross member disposed between the first and second side members;
a second cross member forward of and connected to the first cross member operable to connect an implement to the first cross member, wherein the second cross member and the implement are rotatable relative to the first cross member about a longitudinal axis defined by a longitudinal centerline of the attachment frame; and
a spring assembly carried by the second cross member and placed on a single side of the attachment frame relative to the longitudinal centerline of the attachment frame, wherein the spring assembly is operable to bias the second cross member into a horizontal position that is substantially parallel to the first cross member.

23. An attachment frame for a tractor mounted implement comprising:
a first side member having a first end and a second end opposite to the first end and being operable to connect to a frame of a tractor;
a second side member spaced laterally apart from the first side member, the second side member having a third end and a fourth end opposite to the third end and being operable to connect to the frame of the tractor;
a first cross member disposed between the first and second side members; and
a second cross member forward of and connected to the first cross member operable to connect an implement to the first cross member, wherein the second cross member and the implement are rotatable relative to the first cross member about a longitudinal axis defined by a longitudinal centerline of the attachment frame;
wherein the second end of the first side member and the fourth end of the second side member are rearward of the first cross member and the second cross member.

24. The attachment frame of claim 23 wherein the first end of the first side member and the third end of the second side member are forward of the first cross member and the second cross member.

\* \* \* \* \*